United States Patent
Roberts et al.

(10) Patent No.: US 8,291,445 B2
(45) Date of Patent: Oct. 16, 2012

(54) EXPANDED MEDIA CONTENT ACCESS SYSTEMS AND METHODS

(75) Inventors: Brian Roberts, Frisco, TX (US); Heath Stallings, Grapevine, TX (US); Don Relyea, Dallas, TX (US); Ruchir Rodrigues, Irving, TX (US); Sathya Bhaskaran, Erode (IN); Ramakrishnan Ramaswamy Sankaranarayan, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 412 days.

(21) Appl. No.: 11/753,788

(22) Filed: May 25, 2007

(65) Prior Publication Data

US 2008/0294775 A1   Nov. 27, 2008

(51) Int. Cl.
 *G06F 13/00* (2006.01)
 *G06F 3/00* (2006.01)
 *G06F 15/173* (2006.01)
 *G04N 5/445* (2006.01)
 *H04N 7/16* (2006.01)
 *H04N 7/20* (2006.01)
 *H04N 7/18* (2006.01)

(52) U.S. Cl. ............... 725/10; 725/46; 725/48; 725/59; 725/62; 725/63; 725/68; 725/74; 725/78; 725/80; 725/82; 725/84; 725/85; 709/225

(58) Field of Classification Search ............... 725/46, 725/48, 59, 62, 63, 68, 74, 78, 80, 82, 84, 725/85; 709/225
See application file for complete search history.

(56) References Cited

U.S. PATENT DOCUMENTS

| | | | |
|---|---|---|---|
| 6,725,303 B1 * | 4/2004 | Hoguta et al. ............... 710/106 |
| 7,430,753 B2 * | 9/2008 | Gray et al. ................... 725/80 |
| 7,496,630 B2 * | 2/2009 | Arellano et al. ............. 709/206 |
| 2002/0026647 A1 * | 2/2002 | Yim et al. ..................... 725/152 |
| 2002/0059425 A1 * | 5/2002 | Belfiore et al. ............... 709/226 |
| 2003/0135860 A1 * | 7/2003 | Dureau ........................... 725/82 |
| 2004/0073915 A1 * | 4/2004 | Dureau ........................... 725/9 |
| 2007/0266414 A1 * | 11/2007 | Kahn et al. .................... 725/113 |
| 2008/0059406 A1 * | 3/2008 | Balestriere et al. ........... 707/2 |

OTHER PUBLICATIONS

"IPTV vs. Internet Television: Key Differences", http://www.masternewmedia.org/2005/06/04/iptv_vs_internet_television_keyhtml/ printed Oct. 10, 2006.
Graham, Jefferson, "Apple Broadens iTunes Use with PC-to-TV Device", USA Today, http://www.usatoday.com/tech/products/2006-09-12-apple-usat_x.htm, printed Sep. 13, 2006.
"TiVo Stretching Into the Internet", http://www.cnn.com/2006/Tech/internet/11/12/tivo.video.ap/index.html, Nov. 14, 2006.

* cited by examiner

*Primary Examiner* — Scott Beliveau
*Assistant Examiner* — Yassin Alata

(57) ABSTRACT

In one of many possible embodiments, a system includes a content provider subsystem providing media content over a closed media network and an open network. At least a subset of the media content provided over the closed media network is provided over the open network. The system further includes a user access subsystem communicatively connected to the closed media network and the open network. The user access subsystem is configured to access the media content over the closed media network and the open network and to process and provide at least a component of the accessed media content for presentation to a user. The user access subsystem includes a content processing device configured to decode the media content accessed over the closed media network and an expansion content processing device configured to decode the media content accessed over the open network.

20 Claims, 15 Drawing Sheets

US 8,291,445 B2

EXPANDED MEDIA CONTENT ACCESS SYSTEMS AND METHODS

BACKGROUND INFORMATION

The set-top box ("STB") has become an important computing device for accessing media content services and the media content within those services. An STB is typically connected to a cable or satellite, or generally, a subscriber television system, and includes hardware and software necessary to provide the functionality of the subscriber television system at a user site.

The accessibility of media content over a subscriber television system has been traditionally limited to users of STBs that are located within a geographic area served by the subscriber television system. Accordingly, people located outside of the geographic area served by a subscriber television system and/or away from their STBs are generally unable to access the media content provided by the subscriber television system.

Moreover, traditional STBs are limited with respect to their capabilities for processing media content. For example, a conventional subscriber television system generally uses a particular media format to provide media content to subscribers via STBs. Accordingly, traditional STBs are configured to process the particular media format but are not equipped with capabilities for processing certain other media formats. A user of a conventional STB is consequently limited to experiencing media content provided to the STB in particular media formats over a subscriber television network.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

DETAILED DESCRIPTION

I. Introduction

Figure 1:
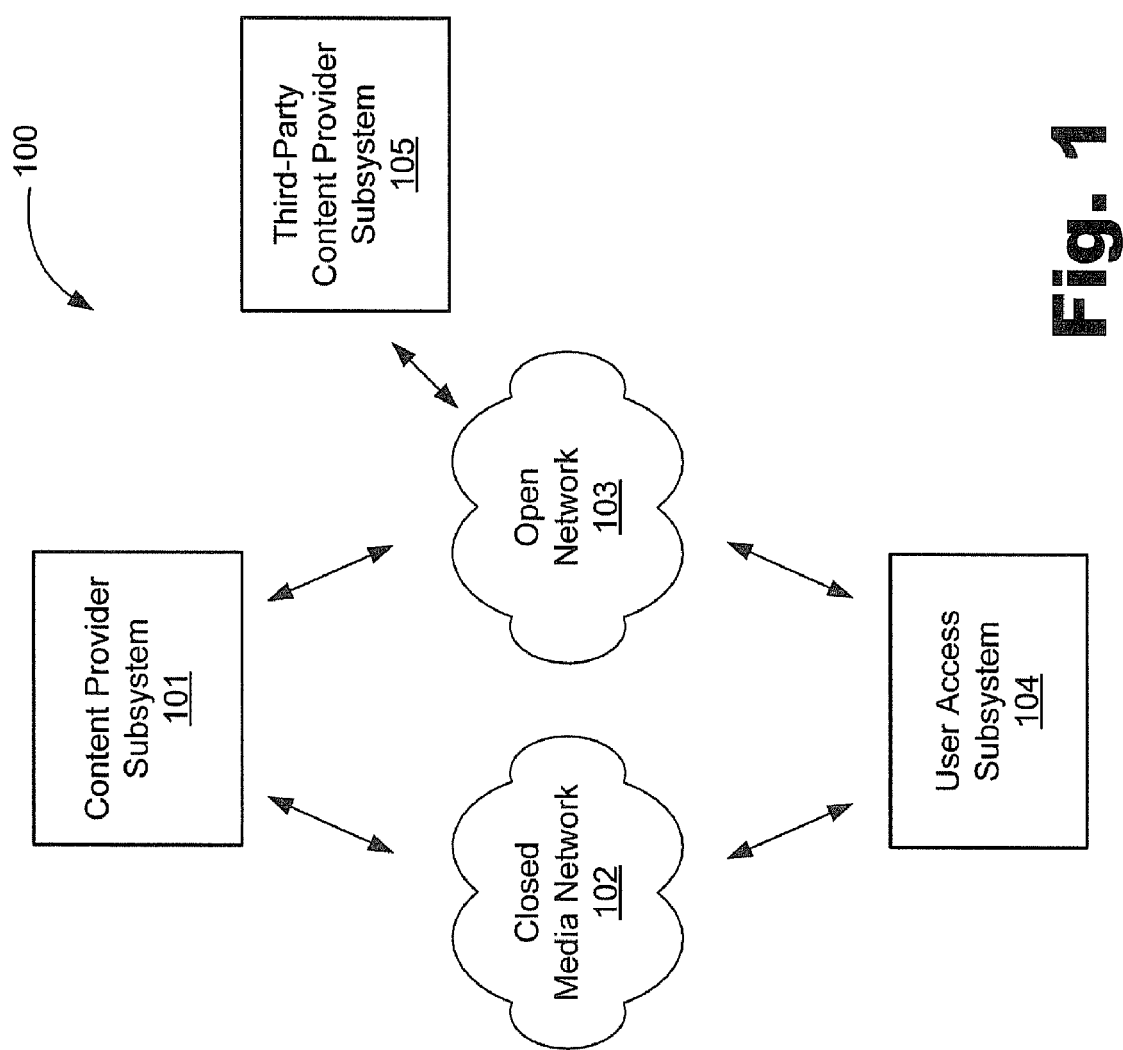
FIG. 1 illustrates an example of a media content access system.

Exemplary systems and methods for providing diverse access to media content are described herein. The media content may include one or more media content instances, which term, as used herein, refers generally to any television program, on-demand program, pay-per-view program, broadcast media program, video-on demand program, independently-produced media, commercial, advertisement, video, multimedia, movie, song, photograph, audio programming, or any segment, portion, component, or combination of these or other forms of media content that may be presented to and experienced (e.g., viewed) by a user. A media content instance may have one or more components. For example, an exemplary media content instance may include a video component and an audio component.

In certain exemplary systems and methods described herein, a content provider subsystem may provide media content over a closed media network (e.g., a closed provider-specific television network) and an open network (e.g., the Internet). At least a subset of the media content provided over the closed network may also be provided over the open network. A user access subsystem may be communicatively connected to the closed media network and configured to receive, over the closed media network, media content provided by the content provider subsystem. The user access subsystem may also be communicatively connected to the open network and configured to receive, over the open network, media content provided by the content provider subsystem. In certain embodiments, the user access subsystem may also access third-party media content that is available on the open network. The user access subsystem may process and provide at least a component of the accessed media content for presentation to a user.

In certain embodiments, the user access subsystem includes a content processing device (e.g., a closed network content processing device such as an STB) and an expansion content processing device configured to expand the capability of the content processing device. For example, different media formats may be used to carry media content over the open network than are used in the closed media network, and the expansion content processing device may be configured to decode or transcode media formats not supported by an STB. Accordingly, the STB may receive and provide media content to the expansion content processing device for decoding. The expansion content processing device may decode the media content and provide the decoded media content either to an output device for presentation or to the STB, which can provide the decoded media content to an output device for presentation.

In certain embodiments, the expansion content processing device may be configured to include user profile information associated with a user. With the user profile information, the expansion content processing device can provide a user with access to his user profile and associated media content, settings, and preferences from any location providing a connection to the closed or open network. For example, when the expansion content processing device is connected to an STB having a connection to at least one of the closed media network and the open network, the user profile information included in the expansion content processing device may be used by the STB to gain access to the user profile associated with the user. Accordingly, the expansion content processing device may be used as a key to gain access to a user profile from any STB connected to the closed media network. For instance, a user may connect his expansion content processing device having user profile information to an STB of another person, and the STB may utilize the profile information in the expansion content processing device to access the user profile associated with the user. By way of another example, the user may connect his expansion content processing device having user profile information to a connection to the open network, such as a third-party broadband connection to the Internet, for example, and through the connection gain access to his user profile.

The expansion content processing device may be a portable (e.g., handheld) device configured to be communicatively connected to a closed network content processing device. For example, the expansion content processing device may be configured to plug into a bus, such as a serial bus, one possible serial bus being a Universal Serial Bus ("USB") port of the content processing device.

In certain embodiments, the expansion content processing device may be configured to access media content over the open network, including media content that is provided by a content provider over the closed media network and the open network. With an expansion content processing device configured to access media content over the open network, a user has diverse access to media content. For example, a subscriber to media content provided over the closed media network may travel outside of the geographic area served by the closed network. The subscriber may bring along an expansion content processing device and use the expansion device from outside of the geographic area to access a copy of the same media content that is provided over the closed media network. According to one embodiment, for instance, the subscriber may connect the expansion content processing device to a broadband connection and a television in a hotel room and use the expansion device to access media content over the open network via the broadband connection. The subscriber may even access at least a subset of the same media content that the subscriber would normally be able to receive at his home over the closed media network.

Components and functions of exemplary embodiments of systems and methods for accessing media content will now be described in more detail.

II. Exemplary System View

FIG. 1 illustrates an example of a media content access system 100, according to one embodiment. As shown in FIG. 1, media content access system 100 (or simply "system 100") may include a content provider subsystem 101 communicatively connected to and configured to provide media content over a closed media network 102 and an open network 103. System 100 may further include a user access subsystem 104 communicatively connected to and configured to access media content provided over the closed media network 102 and the open network 103. In certain embodiments, the user access subsystem 104 may access over the open network 103 media content provided by the content provider subsystem 101 and media content provided by a third-party content provider subsystem 105.

With respect to media content provided by the content provider subsystem 101, system 100 may provide a user (e.g., a subscriber) with a first access subsystem (e.g., a primary access subsystem) and a second access subsystem (e.g., a secondary access subsystem). In certain embodiments, for example, the first access subsystem may include the user access subsystem 104 accessing content provider media content via the closed media network 102, and the second access subsystem may include the user access subsystem 104 accessing content provider media content via the open network 103. In certain embodiments, the second access subsystem is configured to expand the geographic reach of content provider media content beyond a geographic area served by the first access subsystem The second access subsystem may also expand the technological reach of the media content, including providing capabilities for processing media content embodied in various media formats such as Internet media formats, for example.

In certain embodiments, elements of system 100 may include any computer hardware and/or instructions (e.g., software programs), or combinations of software and hardware, configured to perform the processes described herein. In particular, it should be understood that elements of system 100 may be implemented on one physical computing device or may be implemented on more than one physical computing device. Accordingly, system 100 may include any one of a number of well known computing devices, and may employ any of a number of well known computer operating systems, including, but by no means limited to, known versions and/or varieties of the Microsoft Windows® operating system, the Unix operating system, Macintosh® operating system, and the Linux operating system.

Accordingly, the processes described herein may be implemented at least in part as instructions executable by one or more computing devices. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

While an exemplary media content access system 100 is shown in FIG. 1, the exemplary components illustrated in FIG. 1 are not intended to be limiting. Indeed, additional or alternative components and/or implementations may be used. Each of the components of system 100 will now be described in additional detail.

A. Third-Party Content Provider Subsystem

The third-party content provider subsystem 105 may include any device or devices configured to make third-party content (e.g., third-party media content) available on the open network 103. For example, the third-party content provider subsystem 105 may include one or more servers (e.g., web, audio, video and/or application servers) providing content on the open network 103.

B. Content Provider Subsystem

Figure 2:
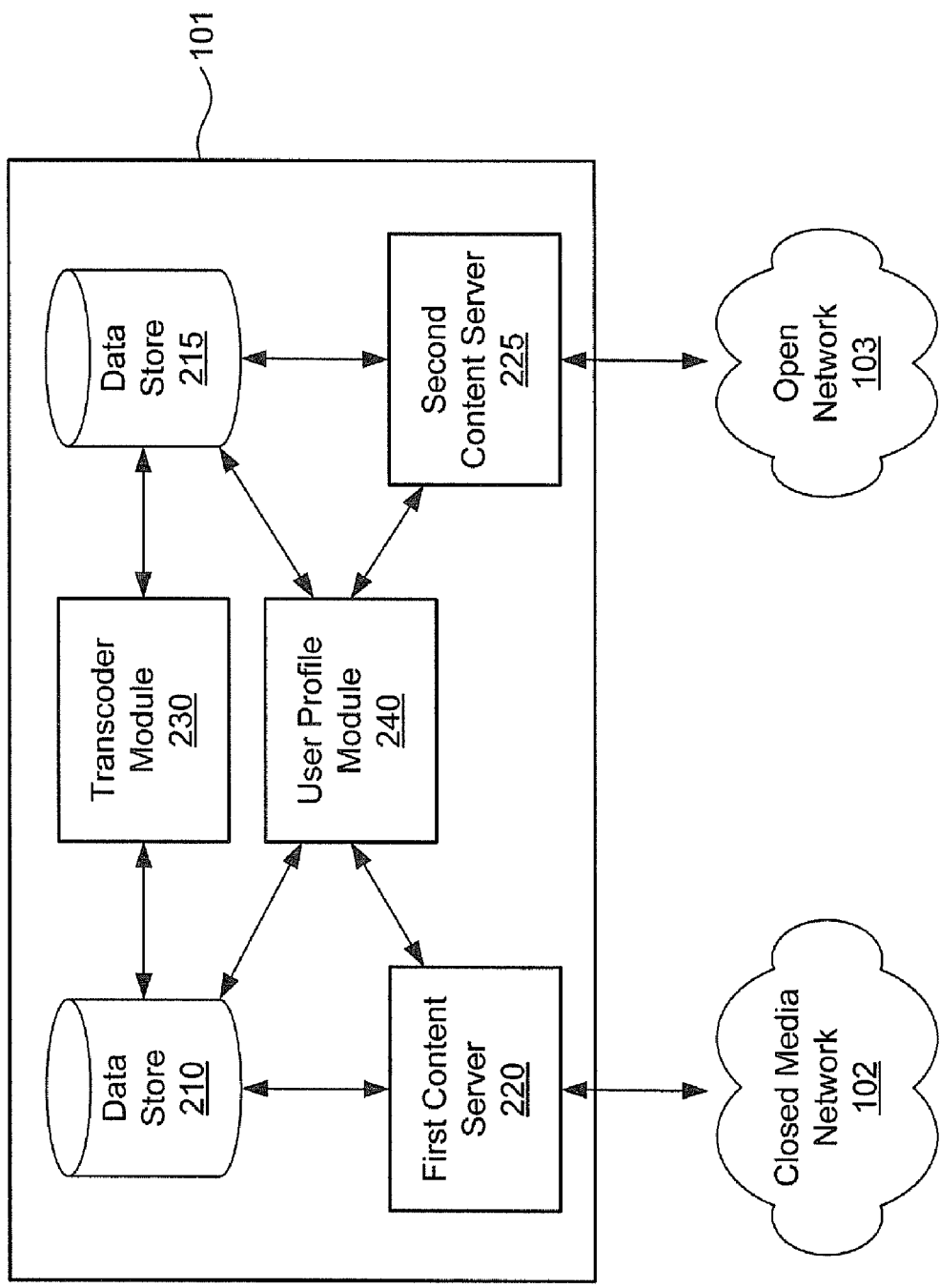
FIG. 2 is an illustration of an exemplary content provider subsystem.

Content provider subsystem 101 may include any hardware, software, and firmware configured to provide media content over the closed media network 102 and the open network 103. As illustrated in FIG. 2, an exemplary content provider subsystem 101 may include a data store 210, data store 215, first content server 220, second content server 225, transcoder module 230, and user profile module 240 communicatively connected to one another as shown.

Data stores 210 and 215 may include one or more data storage mediums, devices, or configurations and may employ any type, form, and combination of storage media, including hard disk drives, read-only memory, caches, databases, optical media, and random access memory. Data stores 210 and 215 may include any known technologies useful for storing, updating, modifying, accessing, retrieving, and deleting data, including data representative of media content and user profile information.

Transcoder module 230 may be configured to copy media content between data stores 210 and 215, including transcoding media content from one media data format to another. For example, media content stored according to a first media format in data store 210 may be decoded and then encoded and stored in data store 215 according to a second media format. This enables media content to be provided in one or more first media formats over the closed media network 102 and in one or more second media formats over the open network 103. In certain embodiments, a first media format may include any media format typically used to provide media content over a closed media network, (e.g., MPEG-2, H.264 AVC, VC-1, FLV, MPEG Stills, WMV, etc.), and a second media format may include any media format typically used to provide media content over an open network (e.g., Internet media formats such as MPEG-4, Advanced Streaming Format ("ASF"), Audio Video Interleave ("AVI"), MPEG-1, QuickTime, QuickTime Pro, RealMedia, Windows Media Video ("WMV"), DivX, MJPEG, MP3, WAV, Advanced Audio Coder ("AAC"), Macromedia Flash, VC-1, MPEG Stills, M4IF, MP4, MPEG-4 BIFS, etc.

Providing media content over multiple networks and in multiple media formats can expand the accessibility of the media content. Any suitable transcoding, encoding, decoding, media data formats, and data storage technologies may be employed by the content provider subsystem 101. In certain embodiments, at least a subset of the media content stored in data store 210 is transcoded and stored in data store 215.

The content provider subsystem 101 may be associated with (e.g., operated by) a content provider, such as media content carrier. The content provider may obtain media content from one or more content sources such as content owners and provide the media content over the closed media network 102 and the open network 103.

The first content server 220 may be configured to make media content stored in data store 210 available on the closed media network 102, and the second content server 225 may be configured to make media content stored in data store 215 available on the open network 103. Because data store 215 may include at least a subset of the media content stored in data store 210, the media content (or a subset thereof) provided over the closed media network 102 may also be provided over the open network 103, thereby providing diverse ways of accessing media content provided by a content provider. The content servers 220 and 225 may include one or more computing devices capable of providing media content over the closed and open networks 102 and 103, respectively.

The media content provided over each network 102 or 103 may be determined based on agreements with content owners. Logic representative of the terms of such agreements may be incorporated into the content provider subsystem 101 such that it can automatically determine the media content to be provided over each network 102 or 103. For example, a content owner may agree to allow a media content instance to be provided over the closed media network 102 but not the open network 103. The media content instance may be flagged such that the content provider subsystem 101 abstains from copying the media content instance from data store 210 to data store 215. In this or similar manner, the content and/or relationships between the content stored in data stores 210 and 215 may be governed at least in part by agreements with content owners.

Subscriber agreements may be used to determine the media content to be made accessible to certain users on each network 102 or 103. For example, a user profile may indicate certain media content channels to be made available to a particular user based on the terms of the corresponding subscription agreement.

The user profile module 240 may store data representative of user profile information, which may include, but is not limited to, authentication, subscription, subscriber, settings, preferences, and permissions information. For example, the user profile module 240 may include information that is used to authenticate a user (or a device corresponding with the user) and to identify, based on subscription and/or permissions information, the media content, settings, or functionality that is available to the user. For instance, a user may subscribe to a particular set of media channels and consequently have access to the media content carried on those channels. Information descriptive of the subscription may be included in a user profile and used by the content provider subsystem 101 to identify the set of media channels to be made available to the user over the closed media network 102. The user profile may also be used to identify the media content that will be made available to the user over the open network 103.

The authentication information stored in or accessible to the user profile module 240 may be the same or different for the closed and open networks 102 and 103. In certain embodiments, for example, a first authenticator may be maintained for a user accessing the content provider subsystem 101 via the closed media network 102, and a second authenticator pre-associated with the first authenticator may be maintained for the user to access the content provider subsystem 101 through the open network 103. The first authenticator may include authentication information obtained from an identification card, and the second authenticator may include login and password information, or authentication information stored on a portable electronic key device, for example. Accordingly, a user may access his user profile and associated media content, settings, and functionality from both the closed media network 102 and the open network 103. In other words, a user is able to access the familiarity, content, and preferences associated with a closed media network user profile over another access network, namely the open network 103.

C. Closed Media Network

The closed media network 102 may include any closed media network configured to provide media content to authenticated users (e.g., subscribers). In certain embodiments, the closed network 102 is closed at least because a content provider associated with the content provider subsystem 101 controls the media content made available over the network 102.

Communications over the closed media network 102 may be performed using any suitable communication technologies, including any technologies capable of delivering media content from the content provider subsystem 101 to the user access subsystem 104.

In certain embodiments, the closed media network 102 includes a subscriber television network such as a cable television network, satellite television network, optical fiber television network, a provider-specific television network (e.g., a Verizon® FIOS® network and/or a TiVo® network), or any combination thereof. In other embodiments, the closed media network 102 may include different closed networks providing subscribers with access to other types of media content, including a satellite media broadcasting network or terrestrial media broadcasting network (e.g., satellite radio), for example. In certain embodiments, the content provider subsystem 101 provides media content to subscribers who pay a premium for service (e.g., a subscription).

In certain embodiments, the closed media network 102 is configured to serve a particular geographic area. The reach of the closed media network 102 may be limited to the geographic area. For example, the closed media network 102 may include transmission media (e.g., optical fiber and/or other cable) deployed and providing physical media for carrying content signals within the geographic area. Media content access via the closed media network 102 may be referred to as "in franchise" access.

D. Open Network

The open network 103 may include any open network configured to carry content (e.g., media content) to user devices connected to the network 103. Communications over the open network 103 may be performed using any suitable communication technologies, including any technologies capable of delivering media content from the content provider subsystem 101 and/or third-party content provider subsystem 105 to the user access subsystem 104. In certain embodiments, the open network 103 is open at least because content from more than one provider (e.g., content from providers other than the content provider associated with the content provider subsystem 101) can be made available on the open network 103. The other providers may be referred to as third-party content providers.

In certain embodiments, the open network 103 includes the Internet. Accordingly, content may be made available on the open network 103 in Internet media formats, including any of those mentioned herein. In alternative embodiments, the open network 103 may include other open networks that allow multiple content providers to make media content available to connected user devices.

In certain embodiments, the open network 103 is more widely accessible than the closed media network 102. For example, the closed media network 102 may be accessible only within a geographic area, while the open network 103 may be accessible from any suitable Internet connection (e.g., a broadband connection) capable of supporting media content transmission demands.

E. User Access Subsystem

The user access subsystem 104 may include a combination of multiple devices configured to access, process, and provide media content for experiencing by a user. The user access subsystem 104 may be configured differently in various embodiments. The different configurations generally enable the user access subsystem 104 to access media content over the closed media network 102 and the open network 103, and to process and provide the media content accessed over either network for experiencing by a user. Several exemplary configurations of the user access subsystem 104 will now be described in detail. The examples described below are illustrative and not restrictive in any sense.

1. First Exemplary Configuration

Figure 3:
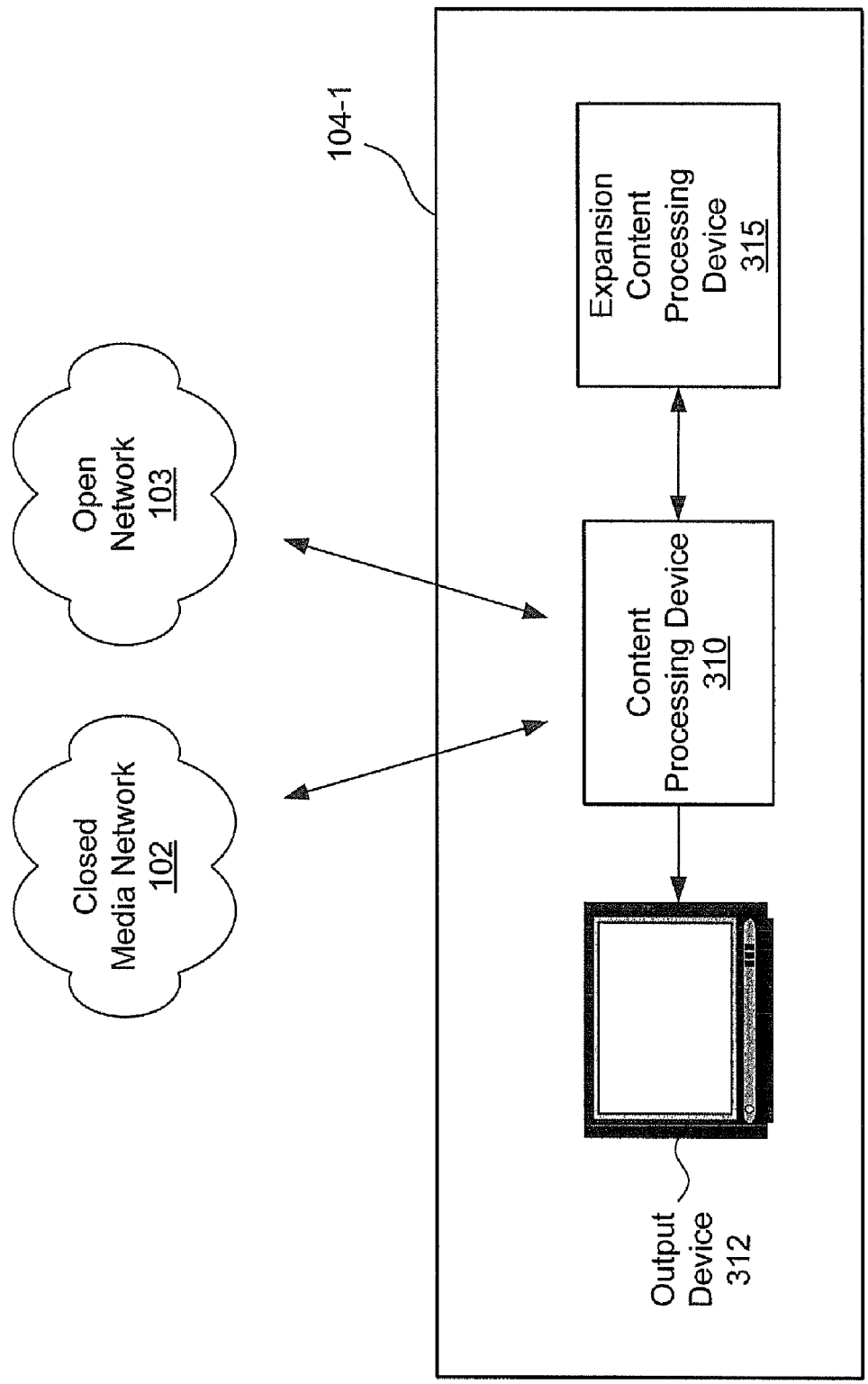
FIG. 3 is an illustration of an exemplary user access subsystem.

FIG. 3 illustrates an exemplary configuration of the user access subsystem 104. The exemplary configuration is denoted as 104-1 in FIG. 3. As shown, the exemplary configuration 104-1 may include a content processing device 310, an output device 312, and an expansion content processing device 315 communicatively connected to one another. The content processing device 310 may be communicatively connected to the closed media network 102 and the open network 103 such that it can access media content provided over the closed media network 102 and the open network 103.

For media content accessed over the closed media network 102, the content processing device 310 may be configured to process and provide at least a component of the media content to the output device 312 for presentation to a user. For media content accessed over the open network 103, the content processing device 310 may be configured to provide the media content to the expansion content processing device 315 for processing, including converting the media content from one media format to another (i.e., to a media format supported by the content processing device 310). The processed (e.g., converted) media content is provided to the content processing device 310, which is able to provide at least a component of the media content to the output device 312 for presentation to a user. In this manner, the expansion content processing device 315 expands the capabilities of the content processing subsystem 310 by enabling the user access subsystem configuration 104-1 to access and process media content in various media formats, including media content accessed over the open network 103 in a media format that may not be supported by the content processing device 310.

While an exemplary configuration 104-1 of the user access subsystem 104 is shown in FIG. 3, the exemplary components illustrated in FIG. 3 are not intended to be limiting. Indeed, additional or alternative components and/or implementations may be used. Each of the components of the user access subsystem configuration 104-1 will now be described in additional detail.

a. Output Device

The output device 312 may include one or more devices configured to present (e.g., display, play, or otherwise provide) media content for experiencing by a user. The output device 312 may include, but is not limited to, a display (e.g., a display screen), a television, computer monitor, handheld device, speaker, or any other device configured to present media content. The output device 312 may receive and process output signals (e.g., component audio and/or video signals, composite audio/video signals, High Definition Multimedia Interface ("HDMI") signals, or Digital Visual Interface ("DVI") signals) provided by the content processing device 310 such that content of the output signals is presented for experiencing by the user.

While FIG. 3 illustrates the output device 312 as being a device separate from and communicatively connected to the content processing device 310, this is exemplary only and not limiting. In other embodiments, the output device 312 and the content processing device 310 may be integrated into one physical device. For example, the output device 312 may include a display (e.g., a display screen) integrated in the content processing device 310.

b. Content Processing Device

The content processing device 310 may include any hardware, software, and firmware configured to receive a data stream from the content provider subsystem 101 over the closed media network 102, process (e.g., decode) the media content included in the data stream, and provide at least a component of the media content to an output device 312 for presentation to a user. The content processing device 310 may include, but is not limited to, a set-top box ("STB"), home communication terminal ("HCT"), digital home communication terminal ("DHCT"), stand-alone personal video recorder ("PVR"), and digital video disc ("DVD") player. Technologies employed in standard STBs may be included in and used by the content processing device 310 to access, process, and output media content provided on the closed media network 102.

In addition, the content processing device 310 may be configured with hardware, firmware, and/or software for accessing media content provided on the open network 103, and for communicating with the expansion content processing device 315. The expansion content processing device 315 may expand the capabilities of the content processing device 310. In certain embodiments, for example, the content processing device 310 may lack capabilities for processing a particular media format of media content accessed over the open network 103. The content processing device 310 may be configured to recognize the media format, or at least the lack of capabilities for processing the media format, and provide the media content to the expansion content processing device 315 for processing, including for example converting the media content to another media format that can be processed and/or output by the content processing device 310.

For instance, the expansion content processing device 315 may decode an Internet media format such as MPEG-4 to generate component audio and/or video signals (or composite audio/video, HDMI, or DVI signals), which can be further processed by the content processing device 310 (e.g., performing post-processing functions and/or forwarding to the output device 312 for presentation). In alternative embodiments, the expansion content processing device 315 may be configured to decode an Internet media format and then encode the decoded data to an MPEG-2 media format, which can be processed by the content processing device 310. The process of decoding a media format and then encoding it into another format may be referred to as transcoding.

Figure 4:
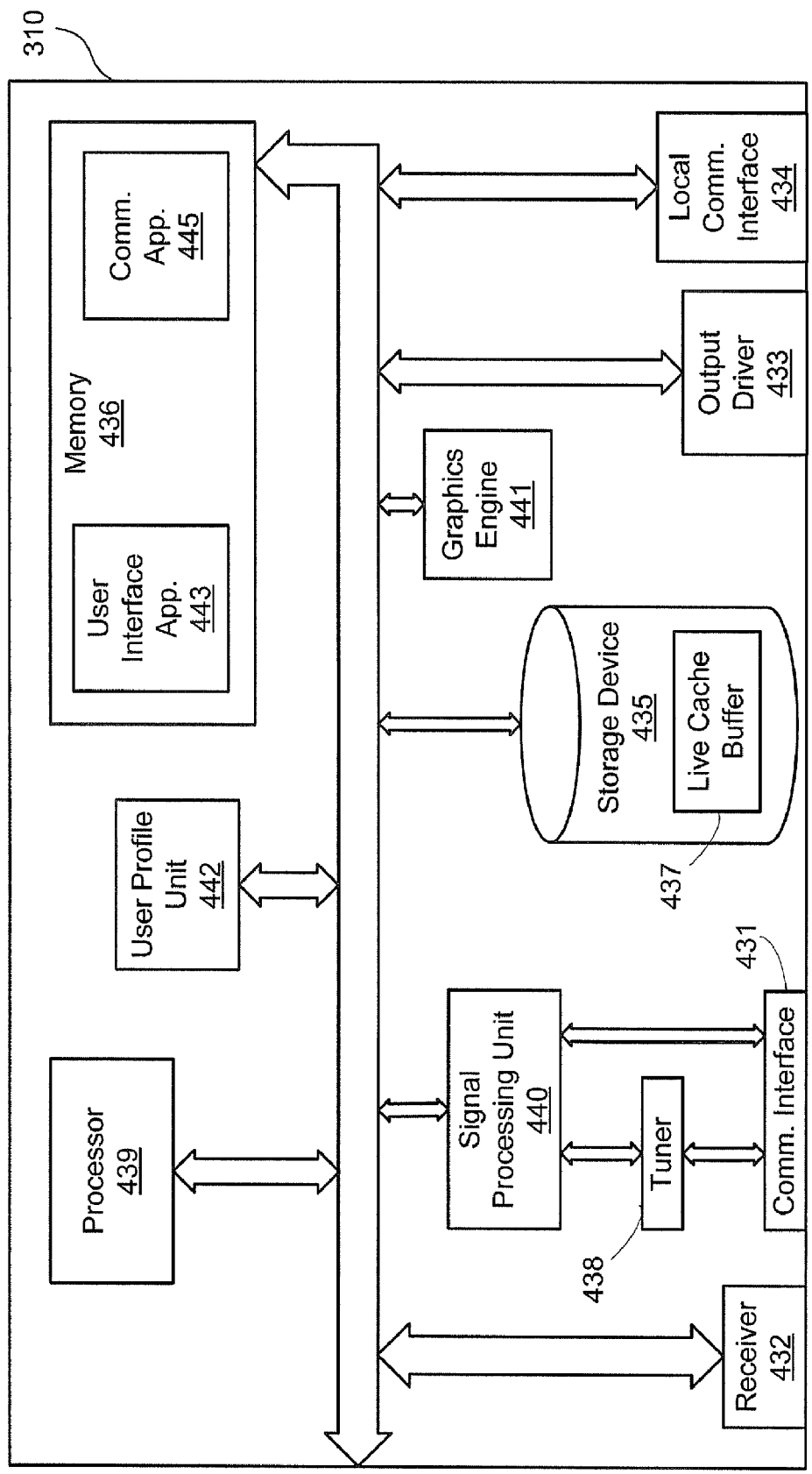
FIG. 4 is an illustration of an exemplary content processing device.

FIG. 4 is a block diagram of an exemplary content processing device 310 (or simply "processing device 310") according to an exemplary embodiment. While an exemplary processing device 310 is shown in FIG. 4, the exemplary components illustrated in FIG. 4 are not intended to be limiting. Indeed, additional or alternative components and/or implementations may be used. Various components of the processing device 310 will now be described in additional detail.

i. Communication Interfaces

The processing device 310 may include a communication interface 431 configured to receive content over the closed media network 102 and the open network 103, including receiving content from the content provider subsystem 101 over either network 102 or 103. The communication interface 431 may include any device, logic, and other technologies suitable for receiving signals and/or data representative of content, including media content data streams provided by the first or second content servers 220 and 225 of the content provider subsystem 101. In certain embodiments, the communication interface 431 is configured to connect the content processing device 310 to both networks 102 and 103 by a single connection, such as a broadband connection enabling the processing device 310 to receive content and/or services from different sources on a single port. Multiple connections may be employed in alternative embodiments. The communication interface 431 can be configured to interface with any suitable communication media, protocols, and formats.

The processing device 310 may also include a receiver 432 configured to receive input commands from a user input device such as a remote control device that may be configured to communicate with the receiver 432 via a wireless link (e.g., an IR link), electrical connection, or any other suitable communication link.

The processing device 310 may also include an output driver 433 configured to interface with or drive the output device 312, including video and audio devices. The output driver 433 may provide an output signal carrying data representative of media content to be presented by the output device 312. The output driver 433 may include any combination of hardware, software, and firmware as may serve a particular application.

The content processing device 310 may also include a local communication interface 434 configured to support local two-way communications. The local communication interface 434 may transmit and receive local communications, including sending and receiving communications over a local communication link such as may be provided by a local area network (e.g., an Ethernet network). The local communications may include signals carrying media content. Accordingly, the local communication interface 434 may include any technologies helpful for locally transmitting and receiving data representative of media content. For example, the local communication interface 434 may support, but is not limited to, Ethernet, Bluetooth, WiFi, USB, and other suitable local communication technologies. In certain embodiments, the local communication interface 434 includes a USB or other type of local communication port.

The content processing device 310 may use the local communication interface 434 to communicate with the expansion content processing subsystem 315 over a local communication link. In one embodiment, the content processing device 310 and the expansion content processing device 315 are connected by a USB 2.0 connection. Of course, other suitable connections may be used, including wireless connections such as a WiFi signal. Exemplary communications with the expansion content processing subsystem 315 via the local communication interface 434 will be described below.

ii. Storage Devices

Storage device 435 may include one or more data storage media, devices, or configurations and may employ any type, form, and combination of storage media. For example, the storage device 435 may include, but is not limited to, a hard drive, network drive, flash drive, magnetic disc, optical disc, or other non-volatile storage unit. As will be described in more detail below, various portions of media content may be temporarily and/or permanently stored in the storage device 435.

The storage device 435 of FIG. 4 is shown to be a part of the processing device 310 for illustrative purposes only. It will be understood that the storage device 435 may additionally or alternatively be located external to the processing device 310.

The processing device 310 may also include memory 436. Memory 436 may include, but is not limited to, FLASH memory, random access memory ("RAM"), dynamic RAM ("DRAM"), or a combination thereof. In some examples, as will be described in more detail below, various applications (e.g., a user interface application) used by the processing device 310 may reside in memory 436.

As shown in FIG. 4, the storage device 435 may include one or more live cache buffers 437. The live cache buffer 437 may additionally or alternatively reside in memory 436 or in a storage device external to the processing device 310. The live cache buffer 437 can provide fast access to recently accessed data or content. Media content data may be temporarily stored (e.g., buffered) in the live cache buffer 437.

iii. Tuner

Tuner 438 is configured to selectively receive content (e.g., media content) carried on a particular media (e.g., television) channel, stream, address, frequency or other carrier. For example, tuner 438 may be tuned to a particular media channel such that the content carried on the media channel is received and can be processed by the processing subsystem 310.

In some examples, the processing subsystem 310 may include multiple tuners 438 such that content carried on different media channels may be concurrently received by the processing subsystem 310. For example, the processing subsystem 310 may include a first tuner configured to receive content carried on an analog video signal and a second tuner configured to simultaneously receive content carried on a digital compressed signal.

In some examples, media content received at the tuner 438 is temporarily buffered, or stored, in the live cache buffer 437. If there are multiple tuners 438, there may be a live cache buffer 437 corresponding to each of the tuners 438.

While tuner 438 may be used to receive various types of media-content-carrying signals broadcast by content provider subsystem 101, content processing device 310 may be configured to receive other types of content signals (including media content signals) from the content provider subsystem 101 without using a tuner. For example, content provider subsystem 101 may broadcast digital streams of data packets (e.g., Internet Protocol ("IP") based data packets used for IPTV signals) that can be received without using a tuner. For such types of content signals, the communication interface 431 may receive and forward the signals directly to signal processing unit 440 without going through the tuner 438. For a broadcast IP-based signal such as may be used for IPTV, for example, the signal processing unit 440 may function as an IP receiver.

iv. Processors

As shown in FIG. 4, the processing device 310 may include one or more processors, such as processor 439 configured to control the operations of the processing device 310. The processing device 310 may also include a signal processing unit 440 configured to process incoming content. The signal processing unit 440 may be configured, for example, to demodulate, decode, and/or parse encoded digital media content. In some examples, the processing device 310 may include one or more signal processing units 440 corresponding to each of the tuners 438. The signal processing unit 440 may include one or more media coders and/or decoders (i.e., codecs). In certain embodiments, the signal processing unit 440 is configured to decode MPEG-2 data streams.

The tuner 438 and signal processing unit 440 may be configured to process (e.g., decode) media formats of media content received over the closed media network 102, including IPTV signals for example. However, the tuner 438 and the signal processing unit 440 may lack capabilities for decoding or otherwise processing certain media formats of media content received over the open network 103, including certain Internet video formats, for example. As described below, the expansion content processing device 315 may be used to expand the media processing capabilities of the content processing device 310 by process media content embodied in such media formats.

As shown in FIG. 4, the processing device 310 may also include a graphics engine 441 configured to generate graphics that are to be displayed by the output device 312. The graphics may include, but are not limited to, views of media content instances (e.g., "on-video" screen views), components of media content instances, program guides, graphical user interfaces, and other graphics. One or more processors of the processing device 310 (e.g., processor 439 and graphics engine 441), together with the output driver 433, may generate and provide output signals configured to cause the output device 312 to present contents of the output signals.

v. User Profile Unit

The content processing device 310 may include a user profile unit 442 configured to store and use user information for gaining access to the content provider subsystem 101 and/or for personalizing the experience of a user. The user profile unit 442 may include any hardware, software, or firmware as may serve a particular application.

In certain embodiments, the user profile unit 442 includes or has access to user authentication data that processing subsystem 310 may transmit to the content provider subsystem 101 to gain access to the content provider subsystem 101 and more particularly to a user profile and the content and/or services pre-associated with the user profile. The user profile module 240 of the content provider subsystem 101 may receive and use the authentication information to identify a corresponding user profile and the associated content and services to be made available to the processing subsystem 310.

In certain embodiments, the user profile unit 442 includes a card reader configured to read information stored on a computer-readable medium such as an identification card. The identification card may include the authentication data that enables the processing subsystem 310 to gain access to the content provider subsystem 101.

vi. Application Clients

One or more applications residing within the processing device 310 may be executed upon initiation by a user of the processing device 310, or by the occurrence of predefined events. The applications, or application clients, may reside in memory 436 or in any other area of the processing device 310 and be executed by one or more processors (e.g., processor 439) of the content processing device 310.

As shown in FIG. 4, one of the applications may be a user interface application 443 configured to generate a user interface through which a user may interact with the processing device 310, including controlling operations and/or settings of the processing device 310. The user interface may include one or more graphical user interfaces ("GUIs") to be displayed to the user by the output device 312. The user interface may provide controls and present information to the user in accordance with predefined layouts, themes, formats, functionality, etc. The user interface may be customized in accordance with individual user profiles.

A communication application 445 may be configured to execute processes for sending and receiving signals through the local communication interface 434. The communication application 445 may execute or support any of the local communication processes described herein, including using the local communication interface 434 to send and receive data representative of media content over a local communication link.

For example, the content processing device 310 may be configured to receive media content over the open network 103. The processing device 310 may detect that it is unable to decode the media format of the received media content. Upon making this determination, the processing device 310 may transmit the media content to the expansion content processing device 315 via the local communication interface 434. As described below, the expansion content processing device 315 may be configured to process the media format of the media content, including decoding the media format into another media format, for example. The decoded media content may be provided to the content processing device 310, which is able to use the decoded media content to generate and provide an output signal carrying the media content to the output device 312 for presentation to a user. The content processing device 310 may in certain embodiments perform post-decoding processing operations on the decoded media content, including for example, overlaying a graphics plane on video included in the media content.

Accordingly, a user of the content processing device 310 is not limited to experiencing network-specific media content carried in certain media formats. Instead, the user can experience media content having various media formats and that has been received either over the closed media network 102 or the open network 103. In certain embodiments, this diverse accessibility of media content even enables the user of the content processing device 310 to experience, in addition to content provider media content available on the closed media network 102, third-party media content that is accessible over the open network 103.

c. Expansion Content Processing Device

Figure 5:
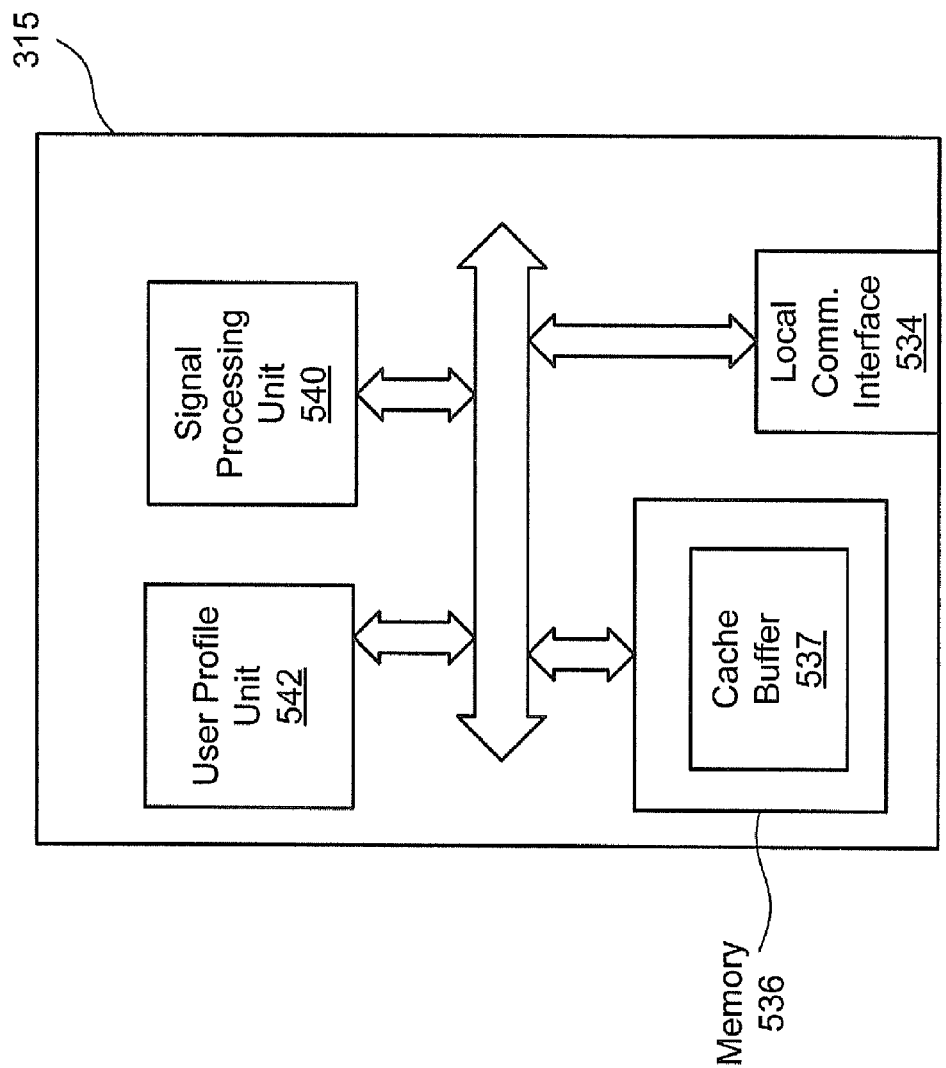
FIG. 5 is an illustration of an exemplary expansion content processing device.

FIG. 5 is a block diagram of an exemplary expansion content processing device 315 (or simply "expansion device 315") according to an exemplary embodiment. While an exemplary expansion device 315 is shown in FIG. 5, the exemplary components illustrated in FIG. 5 are not intended to be limiting. Indeed, additional or alternative components and/or implementations may be used in other embodiments.

As shown in FIG. 5, the expansion device 315 may include a local communication interface 534, which may be configured to support two-way local communications, including any of the local communications described above in relation to the local communication interface 434 of the processing device 310. Accordingly, the expansion device 315 can communicate over a local communication link with the content processing device 310. In one embodiment, the local communication interface 534 includes a USB plug and controller. Alternatively or additionally, the local communication interface 534 may include a High Definition Multimedia Interface ("HDMI") controller supporting local HDMI communications.

The local communication interface 534 may send and receive communications to/from the processing device 310. In particular, the local communication interface 534 may send and receive data representative of media content. As described above, the expansion device 315 may receive media content in a first media format (e.g., a data stream of media content) from the processing device 310. The received media content may be buffered in a cache buffer 537 of a memory 536 and provided to a signal processing unit 540. The signal processing unit 540 may be configured to process the media content, including decoding or transcoding (i.e., decoding and encoding) the received media content from one media format to another. In certain embodiments, for example, the signal processing unit 540 may be configured to decode media content in a first media format to HDMI or component audio and/or video signals. In other embodiments, for example, the signal processing unit 540 may transcode media content from a first media format (e.g., MPEG-4) not supported by the processing device 310 to a second media format (e.g., MPEG-2) that is supported by the processing device 310. The signal processing unit 540 may utilize any potentially helpful technologies for converting media content, including one or more decoders (e.g., a multi-format decoder) for decoding or codecs for decoding and encoding media content.

The processed media content may be buffered and provided to the processing device 310 by way of the cache buffer 537 and local communication interface 534. In other words, the expansion device 315 may form a loop-back stream of media content in which the media content is received, processed (e.g., decoded or transcoded), and then provided to the processing device 310 in decoded or transcoded form. The processing device 310 can provide the decoded content to the output device 312 for presentation to a user.

In this manner, the expansion device 315 can be used to enhance the capabilities of the content processing device 310, including providing capabilities for processing media formats not supported by the content processing device 310. The expansion device 315 can be simply and conveniently connected to a legacy content processing device 310 (e.g., an STB) to augment its capabilities. The enhanced capabilities generally expand the realm of media content that can be accessed and experienced by a user of the content processing device 310. The expansion device 315 may provide an inexpensive way to expand the accessibility of media content, and may in some cases provide an inexpensive alternative to full-fledged upgrades of legacy devices.

In certain embodiments, the expansion device 315 is implemented as a portable device that is easily carried by a user. In some examples, the expansion device 315 is able to be plugged directly or indirectly into a port of the content processing device 310.

In some examples, the expansion device 315 may include user profile information that enables a user to access his user profile by connecting the expansion device 315 to any content processing device 310 connected to the content provider subsystem 101. As shown in FIG. 5, the expansion device 315 may optionally include a user profile unit 542, which may store user profile information. The expansion device 315 may obtain user profile information in any suitable manner, including accessing and receiving a copy of user profile information from the content processing device 310 via a local communication link, for example.

With the user profile information stored in the expansion device 315, the user may connect the expansion device 315 to any content processing device 310 connected to the content provider subsystem 101 and gain access to the user profile corresponding to the user. For example, the user may connect the expansion device 315 to another content processing device 310 of another user (e.g., a friend). The content processing device 310 may be configured to use the user profile information stored in the expansion device 315 to access the corresponding user profile stored in the user profile module 240 of the content provider subsystem 101. Accordingly, the user can use his expansion device 315 with generally any content processing device 310 to access his user profile and pre-associated media content and settings. Accordingly, the user access subsystem configuration 104-1 provides diverse ways for a user to access his user profile and associated content and services.

The configuration 104-1 of FIG. 3 is not limiting. Other configurations may be employed to expand the accessibility of media content. Several examples of alternative configurations of the user access subsystem 104 are described below.

2. Second Exemplary Configuration

Figure 6:
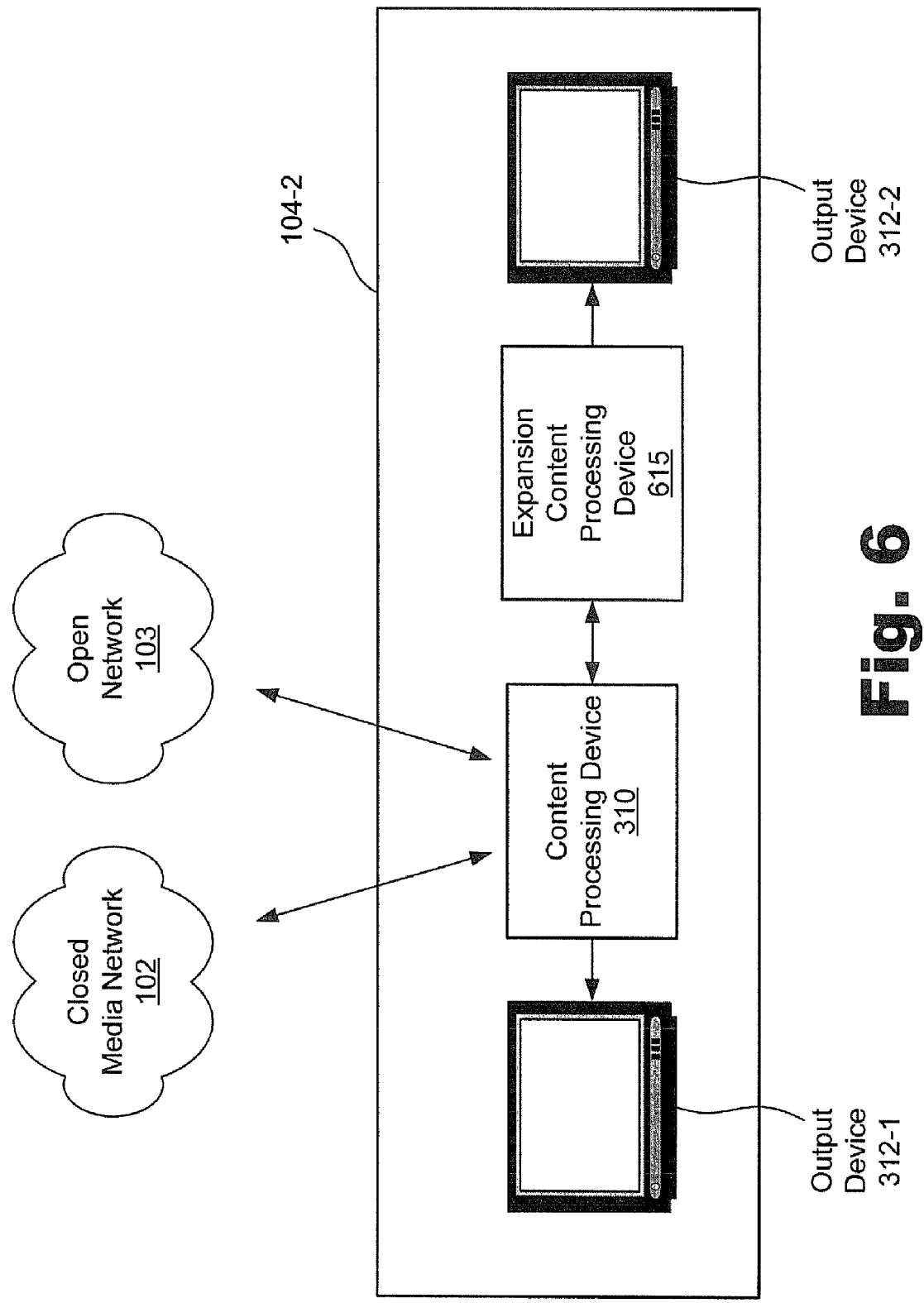
FIG. 6 is an illustration of another exemplary user access subsystem.

FIG. 6 illustrates another exemplary configuration of the user access subsystem 104. The exemplary configuration is denoted as 104-2 in FIG. 6. The configuration 104-2 may be as the configuration 104-1 described above, except that a expansion content processing device 615 (or simply "expansion device 615"), in addition to the components of expansion device 315, may include components for providing at least a component of media content to an output device 312 such as output device 312-2. Thus, additionally or alternatively to looping processed (e.g., decoded) media content back to the content processing device 310 for presentation by output device 312-1, the expansion device 615 may be configured to provide the media content to output device 312-2.

Accordingly, the configuration 104-2 may support various options for the presentation of media content received by the content processing device 310. For example, the connection between the processing device 310 and the expansion device 615 may be a wireless connection such that the devices 310 and 615 can communicate even when located in different areas (e.g., rooms) of a user premises. This enables media content received by the content processing device 310 over the closed media network 102 or the open network 103 to be transmitted to the expansion device 615 for processing (e.g., decoding) and presentation of the media content in another room.

Figure 7:
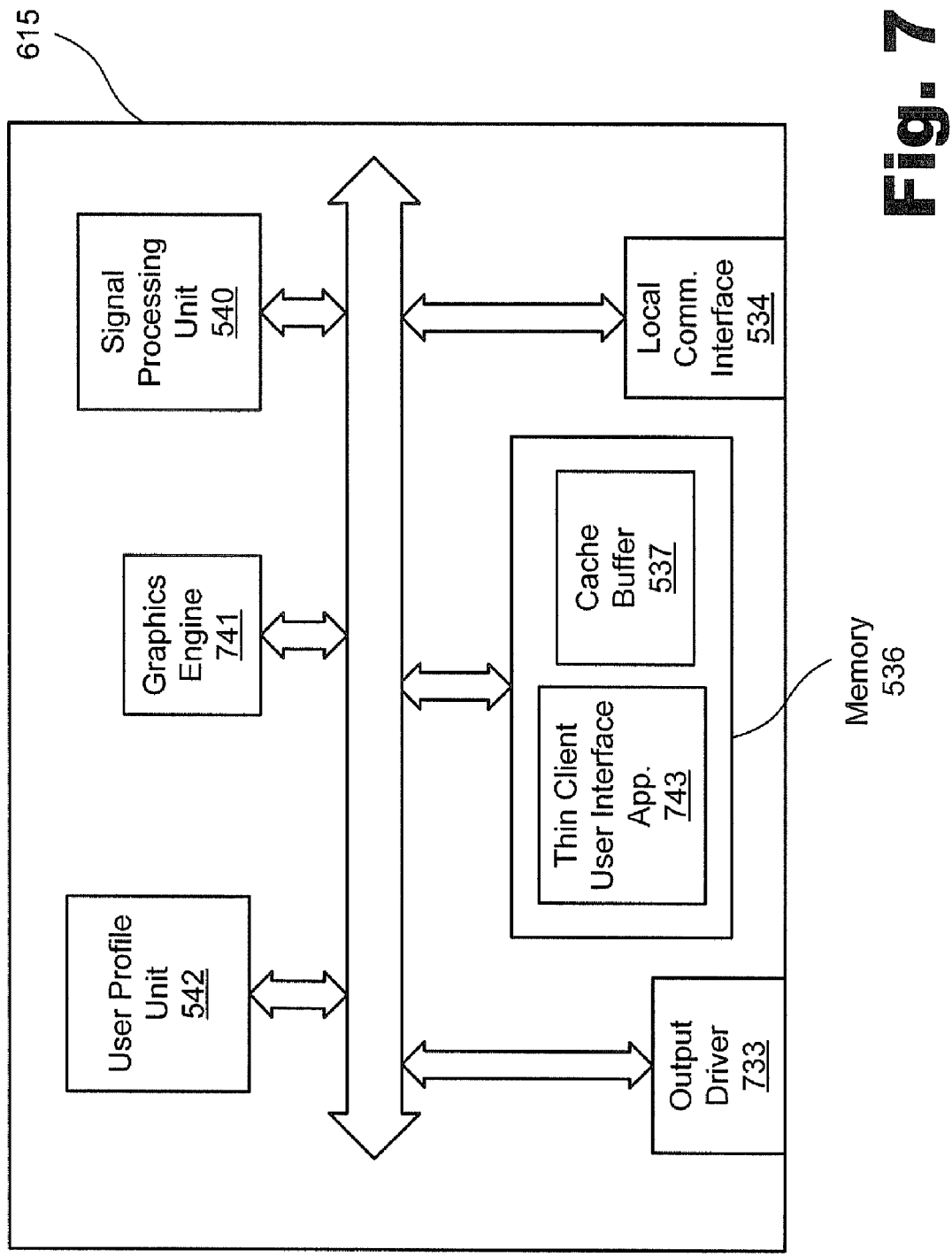
FIG. 7 is an illustration of another exemplary expansion content processing device.

The expansion device 615 may include any hardware, firmware, and software potentially helpful for providing media content to an output device 312 for presentation to a user. FIG. 7 is a block diagram of an exemplary expansion device 615 according to an embodiment. As shown, the expansion device 615 may include a graphics engine 741 and output driver 733, which may be similar to the graphics engine 441 and output driver 433 of the content processing device 310. The expansion device 615 may include any suitable output interface for connecting with the output device 312, including, but not limited to, S-video and component audio and/or video ports. Accordingly, the expansion device 615 may receive media content from the content processing device 310, process the media content, and provide the processed media content to the output device 312-2 for presentation.

The expansion device 615 may also include a thin client user interface application 743 residing in a memory 536 and configured to be executed to provide a user interface to a user. The application 743 may be a scaled down (i.e., thin) version of the user interface application 443 of the content processing device 310. When the expansion device 615 and the content processing device 310 are communicatively connected to one another, the expansion device 315 may selectively utilize either the thin client user interface application 743 or the full user interface application 443 of the processing device 310. The thin client user interface application 743 may be configured to give a user a similar experience (e.g., aesthetically and/or functionally) as that provided by the user interface application 443.

The expansion device 615 provides an inexpensive and convenient way to provide a user with diverse options for experiencing media content. The user can experience media content received by the content processing device 310 using either an output device 312-1 driven by the content processing device 310 or an output device 312-2 driven by the expansion device 615. Hence, the user may experience the media content in different rooms of a user premises, for example, without having to purchase or lease a second content processing device 310.

3. Third Exemplary Configuration

Figure 8:
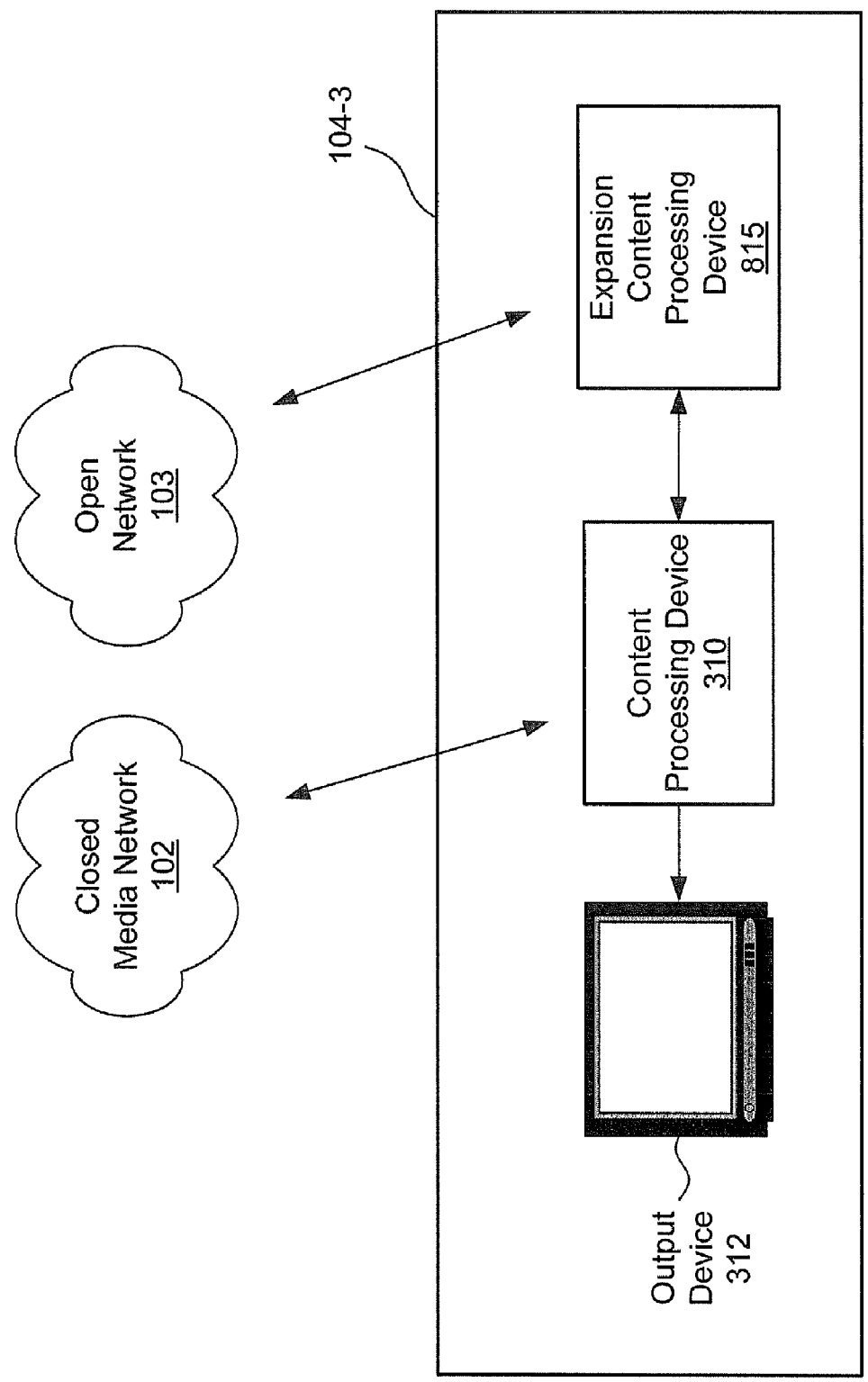
FIG. 8 is an illustration of another exemplary user access subsystem.

FIG. 8 illustrates another exemplary configuration of the user access subsystem 104. The exemplary configuration is denoted as 104-3 in FIG. 8. The configuration 104-3 may be as the configuration 104-1 described above, except that an expansion content processing device 815 (or simply "expansion device 815"), in addition to the components of expansion device 315, may include components for accessing media content over the open network 103. The expansion device 815 may be especially useful for configurations in which a content processing device 310 such as a legacy STB does not include capabilities for accessing media content on the open network 103.

Figure 9:
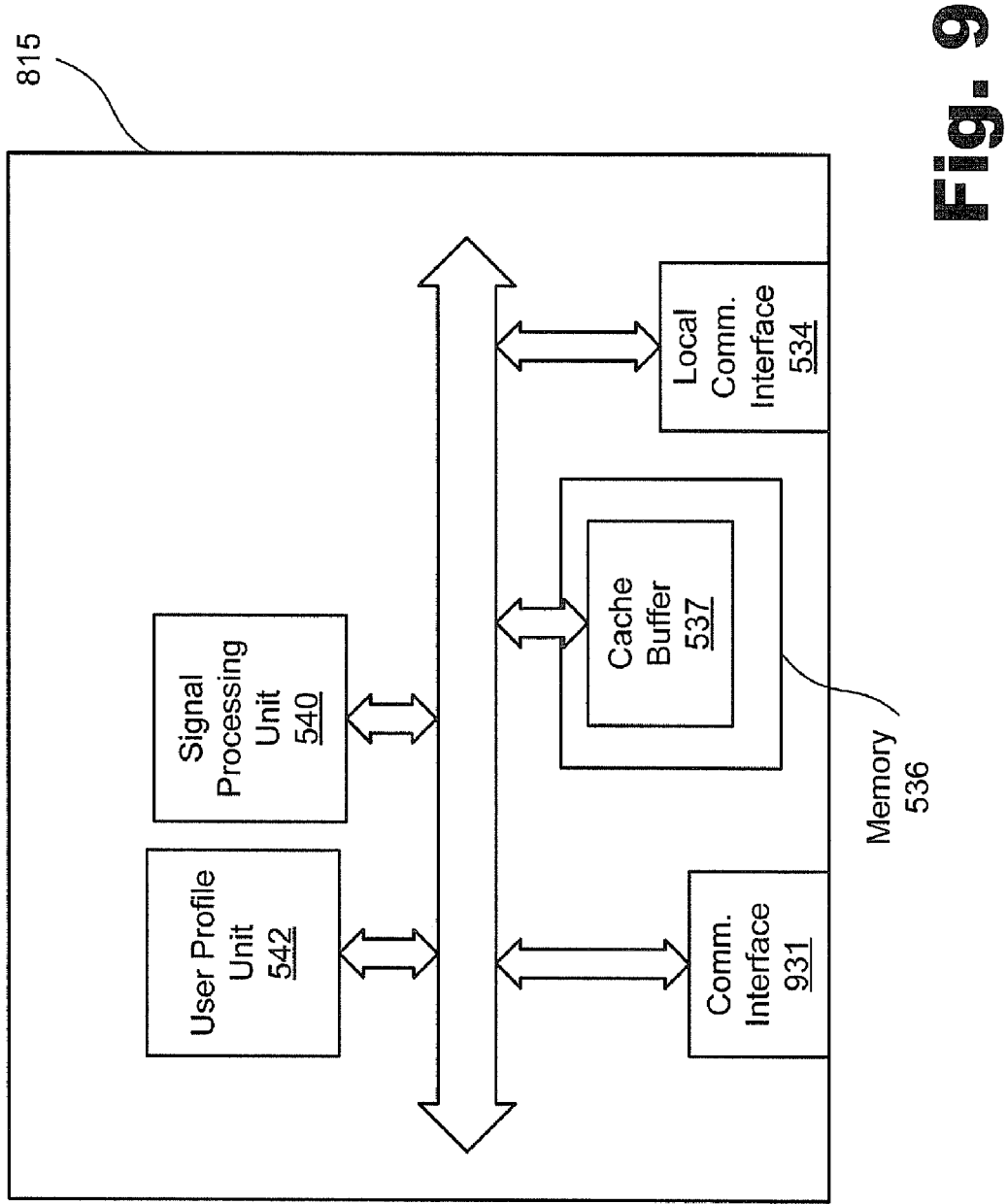
FIG. 9 is an illustration of another exemplary expansion content processing device.

FIG. 9 is a block diagram of an exemplary expansion device 815 according to an embodiment. As shown, the expansion device 815 may include, in addition to a local communication interface 534, memory 536, cache buffer 537, and signal processing unit 540, a communication interface 931 configured to communicate over the open network 103. The communication interface 931 may include any hardware, firmware, and software for such communications. In certain embodiments, for example, the communication interface 931 may include a broadband connection and a modem.

The expansion device 815 may be configured to process (e.g., decode or transcode) media content received over the open network 103 and provide the processed media content to the processing device 310, which is able to provide the processed media content to an output device 312 for presentation to a user.

With the expansion device 815 configured as shown in the configuration 104-3, a user is able to receive media content over the open network 103, including media content provided by a content provider associated with the content provider subsystem 101 and/or media content provided by a third-party content provider. The expansion device 815 can put the media content in a format that can be presented on the same output device 312 that is used to present media content received over the closed media network 102. For example, the user is able to view open network media content (e.g., Internet video) on a television that is also able to present closed network media content (e.g., a broadcast television program).

4. Fourth Exemplary Configuration

Figure 10:
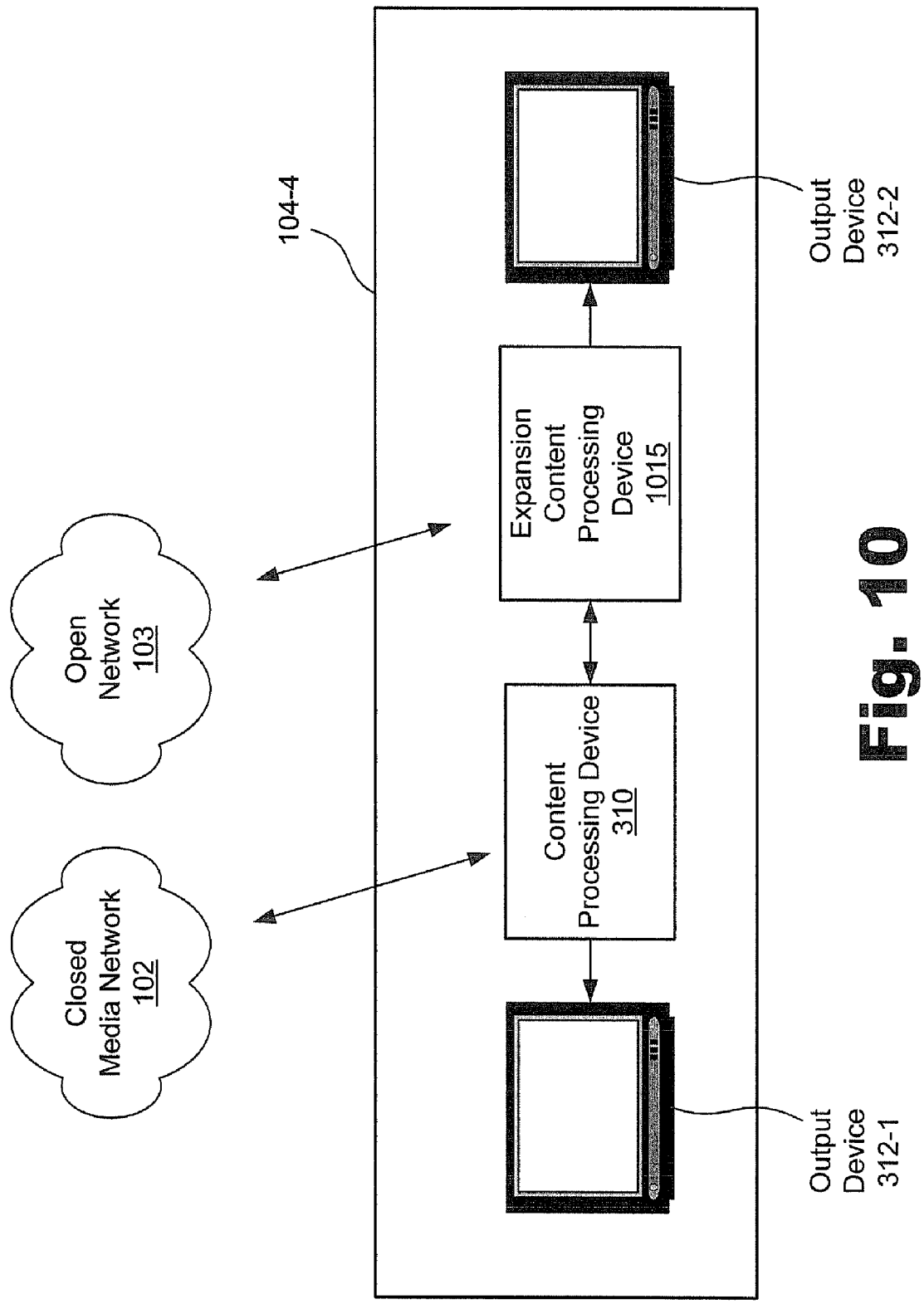
FIG. 10 is an illustration of another exemplary user access subsystem.

FIG. 10 illustrates another exemplary configuration of the user access subsystem 104. The exemplary configuration is denoted as 104-4 in FIG. 10. The configuration 104-4 may be as the configuration 104-3 described above, except that an expansion content processing device 1015 (or simply "expansion device 1015"), in addition to the components of expansion device 815, may include components for providing media content to an output device 312 such as output device 312-2 for presentation to a user. Accordingly, the expansion device 1015 may be configured to access and process open network media content, and provide the processed media content to output device 312-2 for presentation to a user.

When the content processing device 310 and the expansion device 1015 are in communication with one another (e.g., by a local area network), a user is able to selectively choose an output device 312-1 or 312-2 to be used for experiencing media content received over either network 102 or 103. For example, media content received over the closed media network 102 may be processed and provided by the content processing device 310 either to the output device 312-1 for presentation or to the expansion device 1015 for processing and provision to output device 312-2 for presentation. Media content received over the open network 103 may be processed and provided by the expansion device 1015 either to the output device 312-2 for presentation or to the content processing device 310 for processing and provision to output device 312-1 for presentation.

Figure 11:
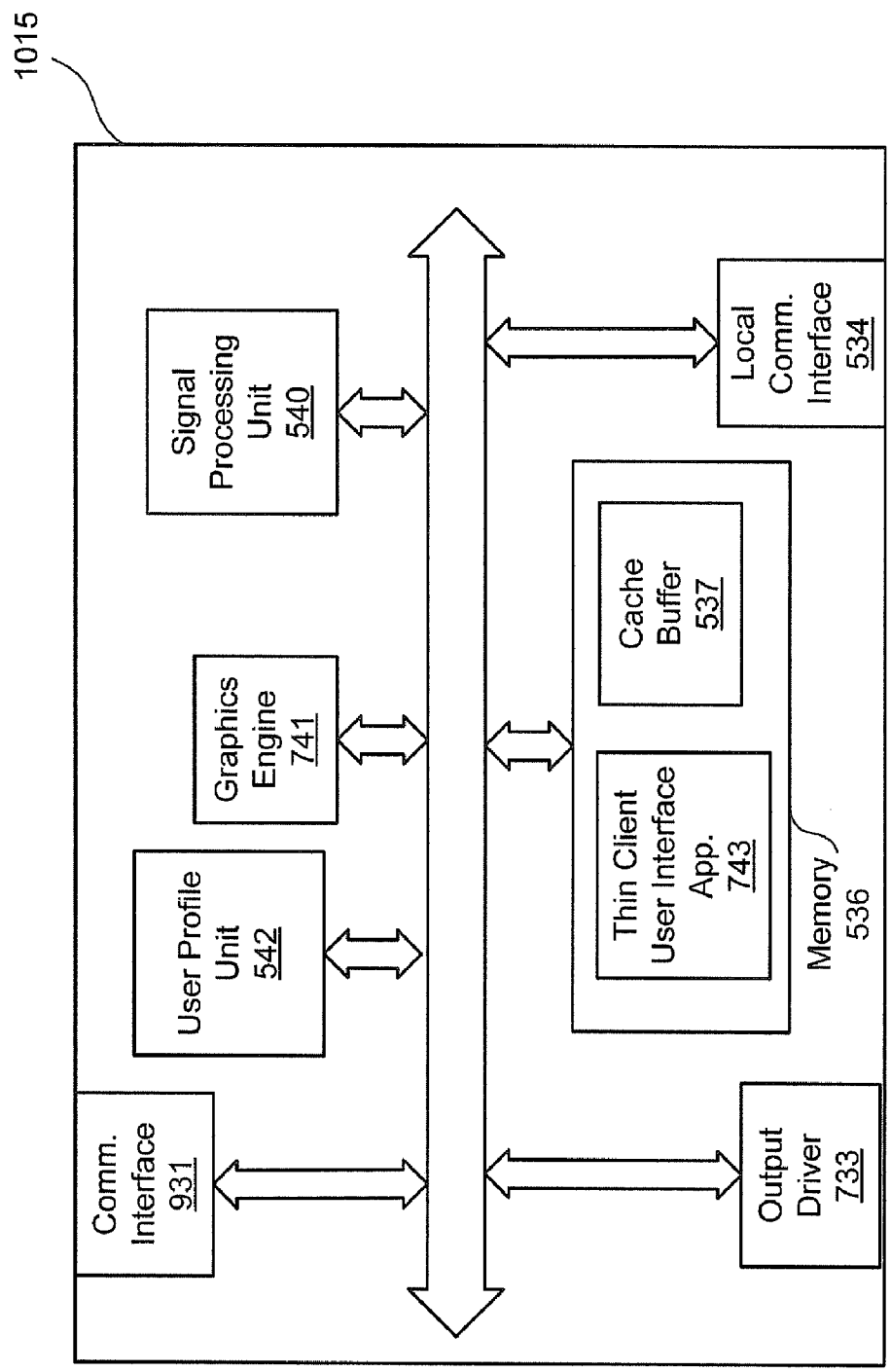
FIG. 11 is an illustration of another exemplary expansion content processing device.

FIG. 11 is a block diagram of an exemplary expansion device 1015 according to an embodiment. As shown, the expansion device 1015 may include, in addition to a local communication interface 534, memory 536, cache buffer 537, signal processing unit 540, and communication interface 931, an output driver 733, graphics engine 741, and thin client expansion user interface application 743. The communication interface 931 may be as described above in reference to FIG. 9, and the output driver 733 and graphics engine 741 may function as described above to provide processed media content to output device 312-2 for presentation.

5. Fifth Exemplary Configuration

Figure 12:
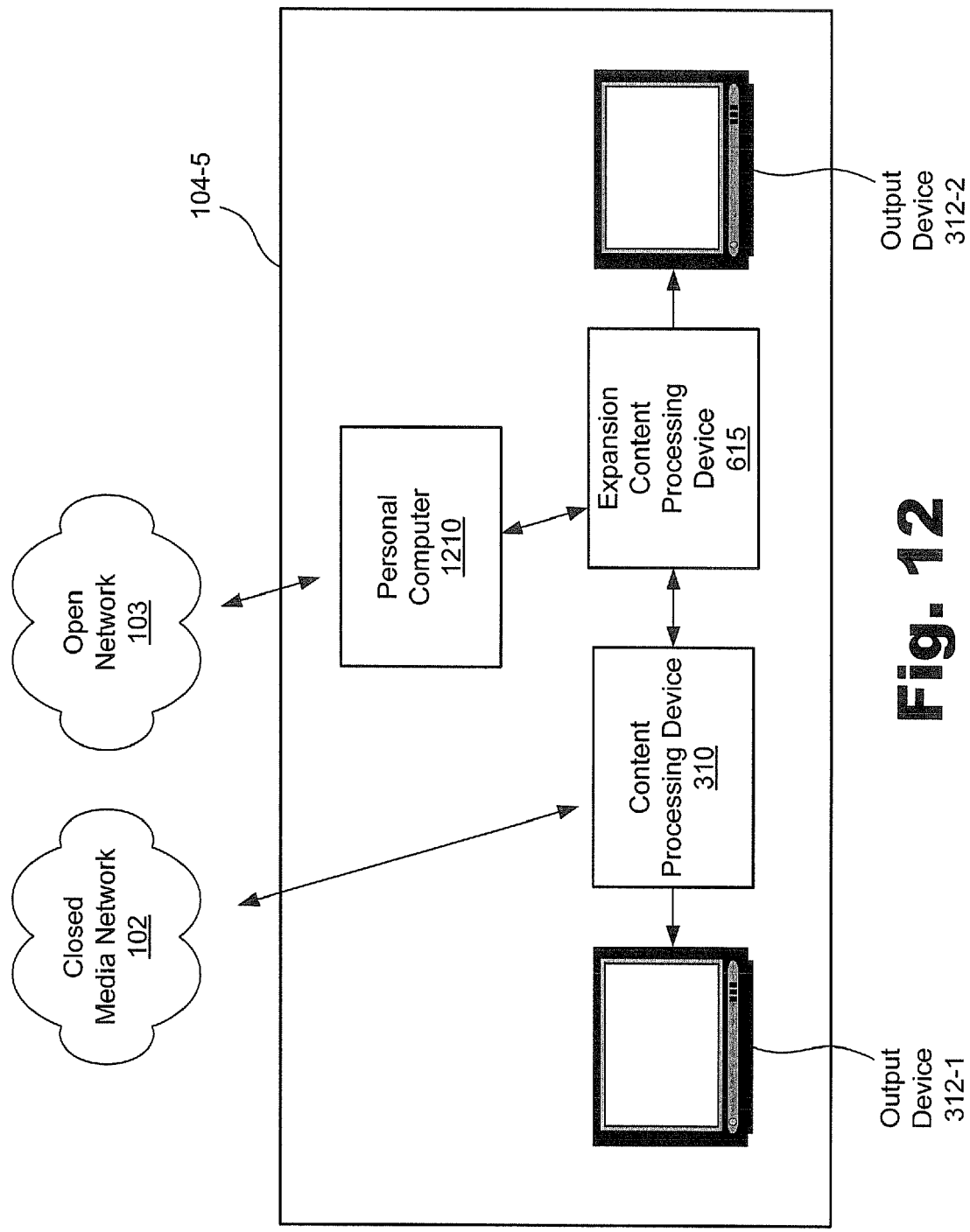
FIG. 12 is an illustration of another exemplary user access subsystem.

FIG. 12 illustrates another exemplary configuration of the user access subsystem 104. The exemplary configuration is denoted as 104-5 in FIG. 12. The configuration 104-5 may be as the configuration 104-2 described above, except that instead of the processing device 310 accessing media content on the open network 103, the user access subsystem configuration 104-5 may include a personal computer 1210 communicatively connected to and configured to access media content provided on the open network 103.

The personal computer 1210 may be configured to forward the accessed media content to the expansion content processing device 615 via a local communication link. In certain embodiments, for example, the personal computer 1210 may be communicatively connected to the expansion device 615 by a local area network, which may include a wireless (e.g., a WiFi) network. Accordingly, a user is able to use a personal computer 1210 to access media content on the open network 103 (e.g., the Internet) and provide the accessed media content to the expansion device 615, which can function as described above to process and provide at least a component of the media content to an output device 312-2 or to the content processing device 310 for presentation to a user. In this manner, a user can experience media content accessed with a personal computer 1210 in a variety of ways, including on an output device 312 such as a television connected to a content processing device 310 or thin-client device 615, for example.

The user access subsystem configuration 104-5 may also enable a user to access third-party media content over the open network, including media content made available by third-party servers. Instead of being limited to experiencing the media content on the personal computer 1210, the media content can be transmitted to the expansion content processing device 615, which is able to process the media content as described above such that the media content may be presented by home entertainment equipment such as a television, for example.

6. Sixth Exemplary Configuration

Figure 13:
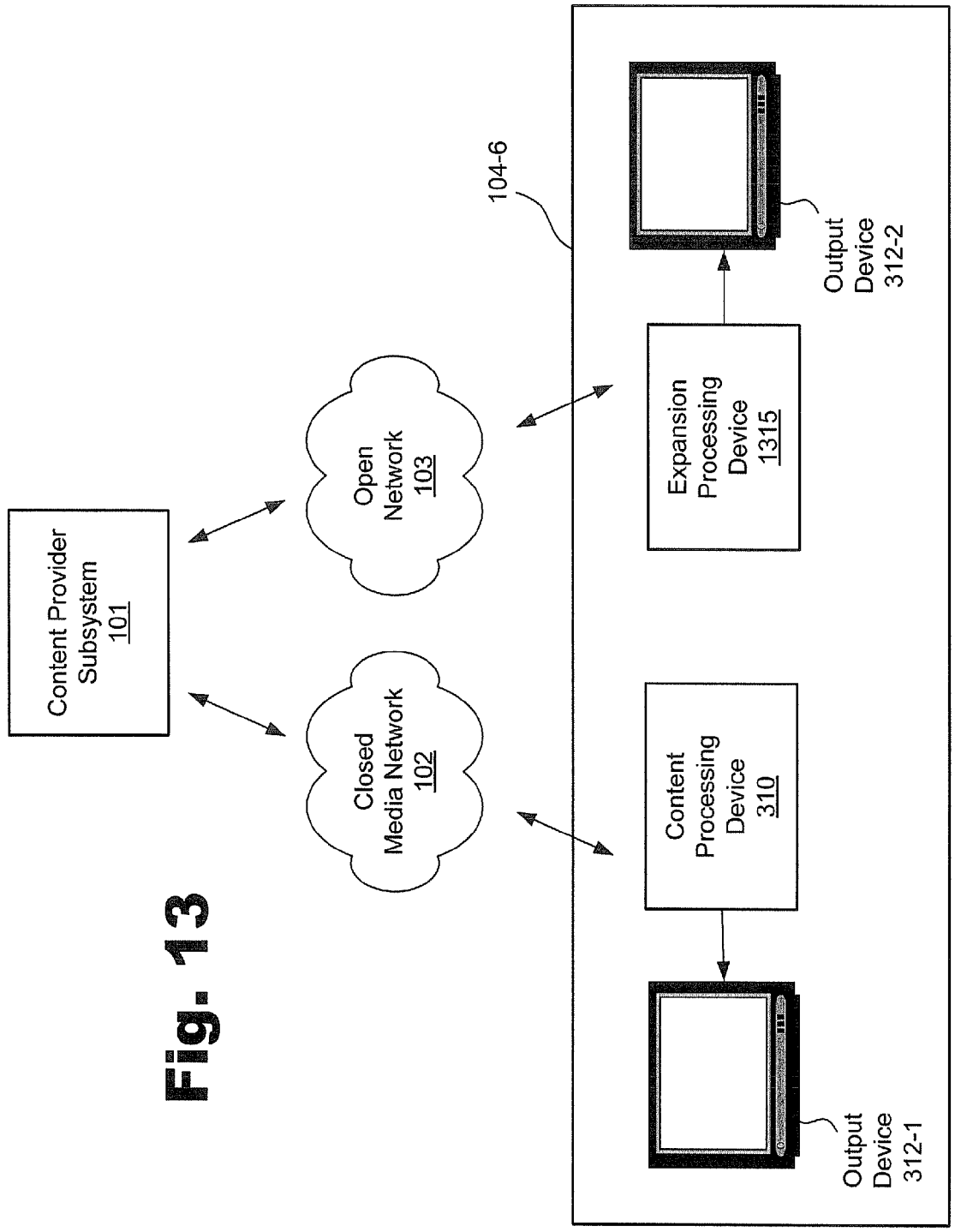
FIG. 13 is an illustration of yet another exemplary user access subsystem.

FIG. 13 illustrates another exemplary configuration of the user access subsystem 104. The exemplary configuration is denoted as 104-6 in FIG. 13. The configuration 104-6 may be as the configuration 104-4 described above, except that an expansion content processing device 1315 (or "expansion device 1315") may be configured to operate generally independently of and/or at a significant distance away from the content processing device 310. The expansion device 1315 may operate without having a local communication connection with the content processing device 310. In other words, the expansion device 1315 may access media content over the open network 103, process the media content (e.g., decode or transcode the media content from one format to another), and provide at least a component of the processed media content to an output device 312-2 for presentation to a user, even when the expansion device 1315 is not locally connected to the content processing device 310. In particular, the expansion device 1315 may perform the above functions while located outside of a geographic area served by the closed media network 102, thereby expanding the accessibility of media content provided by a content provider. Media content access through the expansion device 1315 may be referred to as "out of franchise" access.

The expansion device 1315 may be portable (e.g., a handheld device) such that it can be carried to different locations and used to access media content from the different locations. In certain embodiments, expansion device 1315 may be configured to access media content on the open network 103 using any suitable connection to broadband services, including third-party broadband services. A subscriber to media content provided over the closed media network 102 is able to use the expansion device 1315 to access his user profile and associated media content, settings, and preferences from different locations, including locations outside of the closed media network service area.

For example, a subscriber to closed media network services may configure his user profile using a user interface provided by the content processing subsystem 310. At least part of the user profile and associated information may be stored by the user profile module 240 of the content provider subsystem 101. The subscriber may then use the expansion device 1315 to access, over the open network 103, his user profile and at least a subset of the same media content available to the subscriber over the closed media network 102. For instance, the subscriber may use the expansion device 1315 together with a television and a broadband connection in a hotel room (or some other location) to access at least a subset of the same information, services, and media content that are provided over the closed media network 102. Hence, the expansion device 1315 provides subscribers with expanded options for accessing media content, including content provider media content and/or third-party media content.

Components of the expansion device 1315 may include components similar to those of the exemplary expansion device 1015 of FIG. 11. In certain embodiments, the expansion device 1315 includes a user profile unit 542 that includes or has access to user authentication data that the expansion device 1315 may transmit to the content provider subsystem 101 to gain access to the content provider subsystem 101 and more particularly to the media content and/or services pre-associated with the user profile of a user. The user profile module 240 of the content provider subsystem 101 may use the authentication information to identify a corresponding user profile and the associated content and services to be made available to the expansion device 1315 over the open network 103. Accordingly, in examples in which the processing device 310 and the expansion device 1315 are associated with a common user, access to the user profile of the user may be gained through either the processing device 310 by way of the closed media network 102 or by way of the expansion device 1315 over the open network 103.

The expansion device 1315 may obtain and store user profile information in any acceptable manner. For example, such information may be pre-loaded onto the expansion device 1315 before it is shipped to a user, or the information may be loaded over the open network 103 during an activation process. Alternatively, the user may provide the information using a user interface of the expansion device 1315.

Another option includes the expansion device 1315 communicatively connecting with and receiving user profile information from the content processing device 310. For example, the expansion device 1315 and the content processing device 310 may use their respective local communication interfaces 434 and 534 to communicate when located proximate to one another. Once this step has been performed, the expansion device 1315 can be easily moved about to different locations and used independently of the content processing device 310 to access media content at the different locations.

The expansion device 1315 may include a thin client user interface application 743 configured to generate a thin client user interface through which a user may interact with the expansion device 1315, including controlling operations and/or settings of the expansion device 1315. In certain embodiments, the thin client user interface application 743 provides the same or similar functions and/or aesthetics as provided by the user interface application 443 of the processing device 310. Accordingly, a user associated with the processing device 310 does not have to learn a new interface in order to use the expansion device 1315. In some examples, the thin client user interface application 743 is a scaled down version of the user interface application 443 employed on the content processing device 310.

The expansion device 1315 may provide persons not subscribing to or unable to subscribe to services provided over the closed media network 102 with capacity for accessing at least some of the same services over the open network 103. For example, a person located outside of the geographic area served by the closed media network 102 may obtain the expansion device 1315, connect the expansion device 1315 to the open network 103, and access media content and other services provided by the content provider subsystem 101 over the open network 103. In this manner, the expansion device 1315 can be used to expand the reach of media content and services provided by a content provider.

7. Exemplary Expansion Device Implementations

Any of the above-described expansion devices may be implemented as any suitable physical device. In some examples, the expansion device is implemented as a physical device having a small form factor for ease and convenience. In some examples, the expansion device is implemented as a small physical device having a plug configured to physically and communicatively connect the expansion device to the content processing device 310. In some examples, the expansion device may be implemented in a remote control device (e.g., a universal remote control device) that can also be used to control the settings and operations of the content processing device 310. The remote control device may communicate with the content processing device 310 through the receiver 432 and/or the local communication interface 434. Accordingly, a user of the content processing device 310 may be able to enhance the capabilities of the content processing device 310 by obtaining a remote control device having one or more functionalities of the above-described expansion devices.

8. Supplemental Memory

Any of the above-described expansion devices may be used as supplemental memory for the content processing device 310. For example, the content processing device 310 may be configured to utilize the cache buffer 537 and/or memory 536 of an expansion device that is communicatively connected to the content processing device 310. In this manner, an expansion device can supplement the memory of the content processing device 310. The supplemental memory of the expansion device could be utilized by the content processing device for any suitable purpose, including caching of data such as graphics libraries (e.g., libraries of themed graphics) and program guide data. This capability can be especially beneficial when the content processing device 310 has limited memory resources. For example, the supplemental memory of an expansion device may provide a user of the content processing device 310 with access to more program guide data and/or with the capability to schedule DVR recording events farther into the future (e.g., weeks or months in the future).

III. Exemplary Process Views

Figure 14:
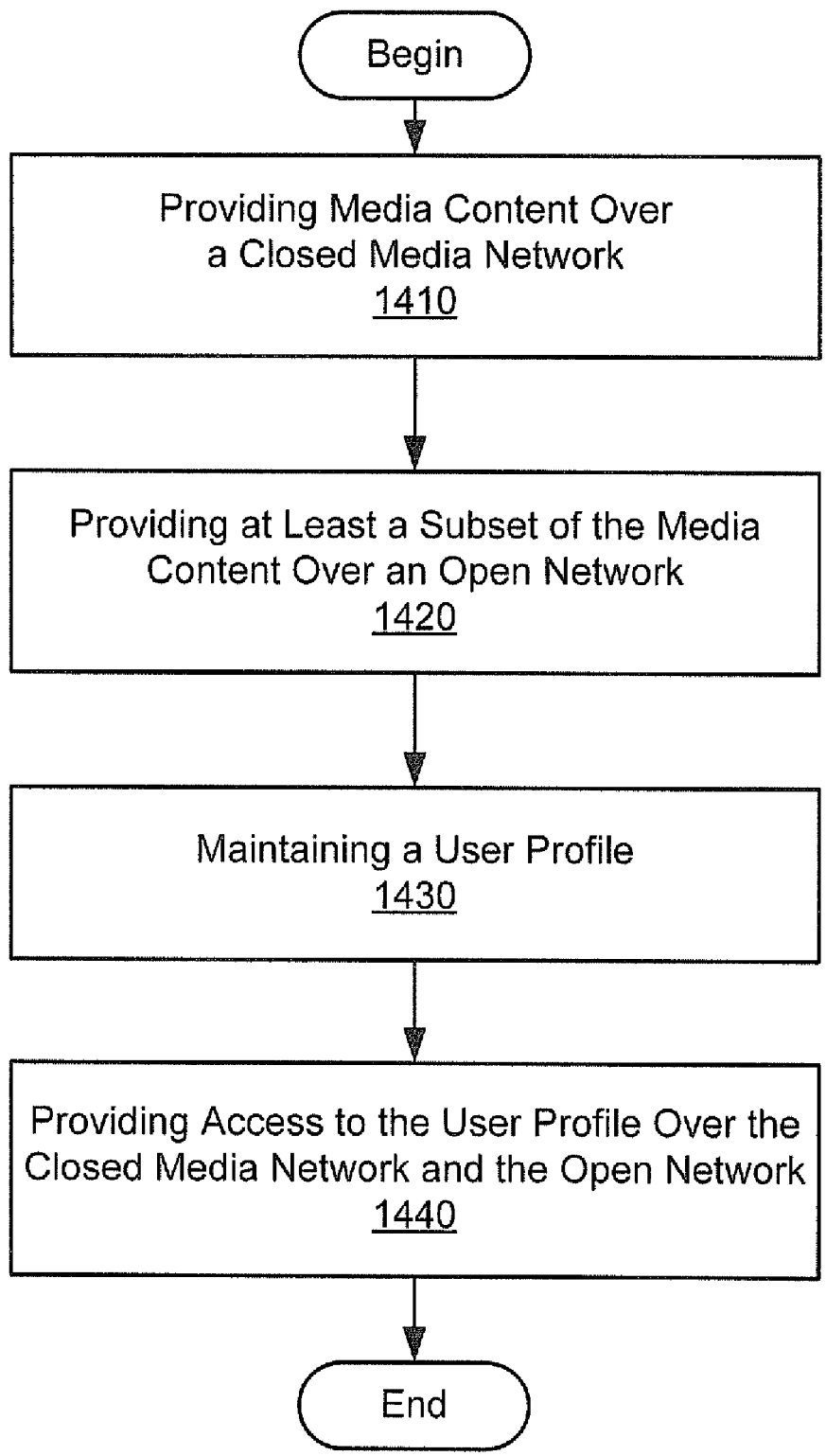
FIG. 14 is a flowchart illustrating an exemplary method of providing expanded access to media content.

FIG. 14 illustrates an exemplary method of providing expanded media content accessibility. While FIG. 14 illustrates exemplary steps according to one embodiment, other embodiments may omit, add to, reorder, and/or modify any of the steps shown in FIG. 14.

In step 1410, media content is provided over a closed media network. Step 1410 may be performed in any of the ways described above, including the content provider subsystem 101 providing media content over the closed media network 102.

In step 1420, at least a subset of the media content is provided over an open network. Step 1420 may be performed in any of the ways described above, including the content provider subsystem 101 providing media content over open network 103. As described above, the content provider subsystem 101 may be configured to transcode and copy at least a subset of the media content provided over the closed media network 102 in preparation for the media content to also be provided over the open network 103.

In step 1430, a user profile is maintained. Step 1430 may be performed in any of the ways described above, including the user profile module 240 of the content provider subsystem 101 maintaining a user profile associated with a user (e.g., a subscriber to services provided over the closed media network 102).

In step 1440, access to the user profile is provided over the closed media network 102 and the open network 103. Step 1440 may be performed in any of the ways described above, including the content provider subsystem 101 providing access to the user profile over the closed media network 102 and the open network 103. Accordingly, a user has diverse options for accessing his user profile and the media content, settings, and preferences associated with the user profile.

Figure 15:
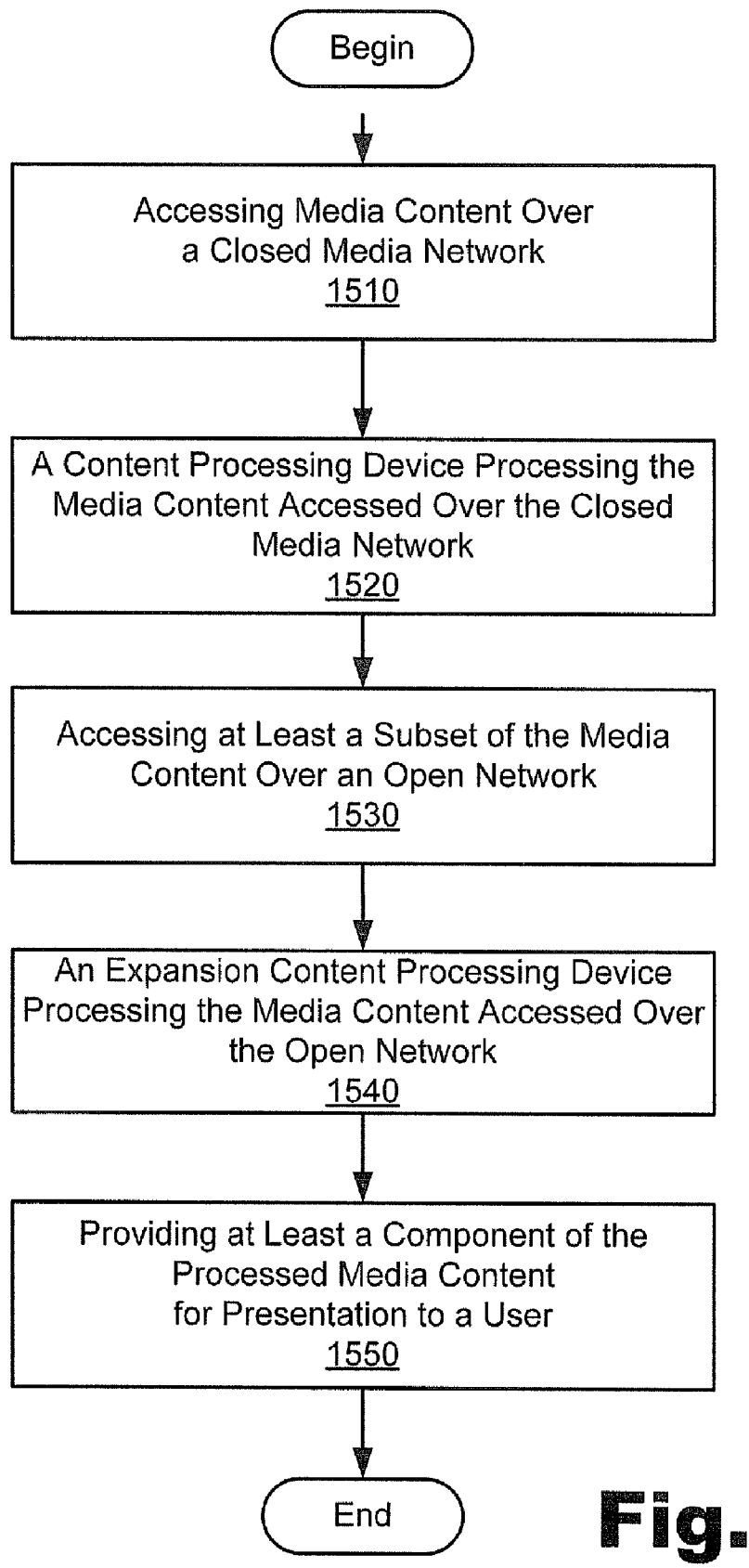
FIG. 15 is a flowchart illustrating an exemplary method of diverse accessing and processing of media content.

FIG. 15 illustrates an exemplary method of diverse accessing and processing of media content. While FIG. 15 illustrates exemplary steps according to one embodiment, other embodiments may omit, add to, reorder, and/or modify any of the steps shown in FIG. 15.

In step 1510, media content is accessed over a closed media network. Step 1510 may be performed in any of the ways described above, including the content processing device 310 accessing media content provided by the content provider subsystem 101 over the closed media network 102.

In step 1520, a content processing device processes the media content accessed over the closed media network. Step 1520 may be performed in any of the ways described above, including the content processing device 310 decoding the media content from one media format (e.g., MPEG-2) to another (e.g., component audio and/or video signals).

In step 1530, at least a subset of the media content is accessed over an open network. Step 1530 may be performed in any of the ways described above, including the content processing device 310, a personal computer, or an expansion content processing device (e.g., expansion device 815, 1015, or 1315) accessing media content provided by the content provider subsystem 101 over the open network 103.

In step 1540, an expansion content processing device processes the media content accessed over the open network. Step 1540 may be performed in any of the ways described above, including an expansion content processing device (e.g., expansion device 315, 615, 815, 1015, or 1315) decoding or transcoding the media content from one media format (e.g., MPEG-4) to another (e.g., MPEG-2 or component audio and/or video signals).

In step 1550, at least a component of the processed media content is provided for presentation to a user. Step 1550 may be performed in any of the ways described above, including the content processing device 310 providing the processed media content to an output device 312 for presentation, an expansion content processing device providing the processed media content to an output device 312 for presentation, or an expansion content processing device providing the processed media content to the content processing device 310, which can post-process the media content and provide it to an output device 312 for presentation.

IV. Alternative Embodiments

The preceding description has been presented only to illustrate and describe exemplary embodiments with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The above description and accompanying drawings are accordingly to be regarded in an illustrative rather than a restrictive sense.

What is claimed is:

1. A system comprising:
    a content provider subsystem configured to provide streaming video content over a closed media network and an open network based on a user profile associated with a user, the user profile indicating the streaming video content available to the user over the closed media network and the open network, wherein at least a subset of the streaming video content provided over the closed media network is also provided over the open network, and wherein the streaming video content provided over the closed media network is encoded in accordance with a first format and the at least a subset of the streaming video content provided over the open media network is encoded in accordance with a second format; and
    a user access subsystem configured to communicatively connect to the closed media network and the open network, the user access subsystem configured to access the streaming video content over the closed media network and the open network and to process and provide at least a component of the accessed streaming video content for presentation to a user, wherein the user access subsystem includes
    a content processing device configured to decode the streaming video content accessed over the closed media network, and
    an expansion content processing device configured to communicatively connect to the content processing device by a local communication link and configured to decode the streaming video content accessed over the open network,
    wherein the expansion content processing device stores user profile information configured to function as a key for use by the content processing device to gain access to the user profile associated with the user and to the streaming video content indicated by the user profile as available to the user,
    wherein the content processing device, absent the local communication link to the expansion content processing device, is incapable of gaining access to the streaming video content indicated by the user profile as available to the user,
    wherein the content processing device utilizes the user profile information stored in the expansion content processing device to access the user profile associated with the user and gain access to the streaming video content indicated by the user profile as available to the user,
    wherein the content processing device receives the at least a subset of the streaming video content over the open network without the at least a subset of the streaming video content passing through the expansion content processing device, detects an inability of the content processing device to decode the at least a subset of the streaming video content received over the open network, and transmits the at least a subset of the streaming video content received over the open network to the expansion content processing device for decoding,
    wherein the expansion content processing device receives and decodes the at least a subset of the streaming video content transmitted by the content processing device and loops the decoded at least a subset of the streaming video content back to the content processing device,
    wherein the content processing device provides at least a subset of the streaming video content to a first output device, and
    wherein the expansion content processing device provides at least a subset of the streaming video content to a second output device, different from the first output device,
    wherein the content processing device comprises a set-top box, and
    wherein the expansion content processing device is implemented as a remote control user input device configured to enable the user to provide user input to control the content processing device.

2. The system of claim 1, wherein the closed media network includes a provider-specific television network and the open network includes the Internet.

3. The system of claim 1, wherein the expansion content processing device is configured to transcode the streaming video content in the second format from the second format to the first format and provide the transcoded streaming video content in the first format to the content processing device.

4. The system of claim 1, wherein the content processing device is configured to provide a user interface, and the expansion content processing device is configured to provide a thin version of the user interface.

5. The system of claim 1, wherein the content processing device receives the decoded at least a subset of the streaming video content from the expansion content processing device and processes and provides the decoded at least a subset of the streaming video content to the second output device for presentation.

6. The system of claim 1, wherein the content processing device comprises a set-top box of a person other than the user associated with the user profile.

7. The system of claim 1, wherein the content processing device stores user authentication data configured to provide the content processing device with access to another user profile associated with a person other than the user associated with the user profile made accessible to the content processing device by the user profile information stored in the expansion content processing device.

8. The system of claim 1, wherein the streaming video content provided by the content provider subsystem over the closed media network includes a flagged media content instance, the content provider subsystem configured to abstain from providing the flagged media content instance over the open network.

9. The system of claim 1, wherein the content provider subsystem comprises:
 a first data store storing the streaming video content provided by the content provider subsystem over the closed media network,
 a second data store storing the at least a subset of the streaming video content provided by the content provider subsystem over the open network, and
 a transcoder module configured to copy the streaming video content stored in the first data store to the second data store, the copying including transcoding the streaming video content from one media data format to another media data format.

10. The system of claim 9, wherein the streaming video content provided by the content provider subsystem over the closed media network includes a flagged media content instance, the content provider subsystem configured to automatically abstain from copying the flagged media content instance from the first data store to the second data store.

11. The system of claim 1, wherein the expansion content processing device comprises a handheld device configured to plug into a port within the content processing device, and wherein the local communication link is established in response to plugging the expansion content processing device into the port.

12. The system of claim 1, wherein the user profile information comprises a first authenticator configured to authorize access to the streaming video content over the closed media network and a second authenticator configured to authorize access to the at least a subset of the streaming video content over the open network.

13. The system of claim 1, wherein the expansion content processing device is configured to decode the at least a subset of the streaming video content and generate component audio and video signals representative of the at least a subset of the streaming video content for processing by the content processing device.

14. An apparatus comprising:
 a local communication interface configured to communicatively connect to a content processing device over a local communication link, the content processing device configured to receive streaming video content in a first media format over a closed media network from a content provider subsystem and receive streaming video content in a second media format over an open network from the content provider subsystem, the local communication interface configured to receive the streaming video content in the second media format from the content processing device, the streaming video content in the second media format having been received by the content processing device over the open network without passing through the apparatus;
 a user profile unit storing user profile information configured to function as a key for use by the content processing device to gain access to a user profile associated with a user and to the streaming video content in the second format over the open network in accordance with the user profile; and
 a signal processing unit configured to decode the streaming video content received from the content processing device;
 wherein the local communication interface is configured to loop the decoded video content back to the content processing device over the local communication link for processing by the content processing device,
 wherein the local communication interface provides the user profile information to the content processing device over the local communication link for use by the content processing device to gain access to the streaming video content in accordance with the user profile,
 wherein absent the user profile information provided over the local communication link, the content processing device is incapable of gaining access to the streaming video content in accordance with the user profile,
 wherein at least a subset of the decoded video content is provided by the content processing device to a first output device, and
 wherein at least as subset of the video content is provided by the local communication interface to a second output device, different from the first output device, wherein the content processing device comprises a set-top box, and
 wherein the expansion content processing device is implemented as a remote control user input device configured to enable the user to provide user input to control the content processing device.

15. The apparatus of claim 14, wherein the content processing device comprises a set-top box that lacks capability to decode the streaming video content in the second media format.

16. The apparatus of claim 14, further comprising:
 a graphics engine configured to process the decoded streaming video content; and
 an output driver configured to provide an output signal carrying data representative of the decoded streaming video content to the second output device for presentation.

17. The apparatus of claim 14, wherein the local communication interface is configured to receive the streaming video content in the first media format from the content processing device over the local communication link, the signal processing unit configured to decode the streaming video content in the first media format, the apparatus further comprising:
 a graphics engine configured to process the streaming video content decoded from the first media format; and
 an output driver configured to provide an output signal carrying data representative of the streaming video content decoded from the first media format to the second output device for presentation.

18. The apparatus of claim 14, further comprising a thin client user interface application, and wherein the content processing device provides a user interface and the thin client user interface application is configured to provide a thin version of the user interface.

19. A method comprising:
 storing, by an expansion content processing device, user profile information associated with a user and configured to function as a key to access streaming video content available to the user;
 utilizing, by a set-top box communicatively connected to the expansion content processing device, the user profile information stored in the expansion content processing device to receive streaming video content over a closed media network from a content provider subsystem and encoded in accordance with a first media format, wherein the set-top box, absent the communicative connection to the expansion content processing device, is incapable of accessing the streaming video content over the closed media network;

decoding, by the set-top box, the streaming video content received over the closed media network;

utilizing, by the set-top box, the user profile information stored in the expansion content processing device to receive at least a subset of the streaming video content over an open network from the content provider subsystem and encoded in accordance with a second media format without the at least a subset of the streaming video content passing through the expansion content processing device, wherein the set-top box, absent the communicative connection to the expansion content processing device, is incapable of accessing the at least a subset of the streaming video content over the open network;

detecting, by the set-top box, an inability of the set-top box to decode the at least a subset of the streaming video content received over the open network;

transmitting, by the set-top box, the at least a subset of the streaming video content received over the open network to the expansion content processing device for decoding;

receiving and decoding, by the expansion content processing device, the at least a subset of streaming video content received by the set-top box over the open network;

looping, by the expansion content processing device, the decoded at least a subset of the streaming video content received by the set-top box over the open network back to the set-top box; and providing, by the set-top box, at least a component of the decoded at least a subset of the streaming video content received over the open network to a first output device, providing, by the expansion content processing device, the at least a subset of the streaming video content received by the set-top box to a second output device, different from the first output device, wherein the expansion content processing device is implemented as a remote control user input device configured to enable the user to provide user input to control the content processing device.

20. The apparatus of claim 14, the user profile indicating the streaming video content in the first format as available to the user over the closed media network and the streaming video content in the second format as available to the user over the open network.

* * * * *